(12) United States Patent
Hayashi et al.

(10) Patent No.: US 9,710,895 B2
(45) Date of Patent: Jul. 18, 2017

(54) IMAGE PROCESSING DEVICE, IMAGE CAPTURE DEVICE, IMAGE PROCESSING METHOD, AND PROGRAM

(71) Applicant: FUJIFILM Corporation, Tokyo (JP)

(72) Inventors: Kenkichi Hayashi, Saitama (JP); Masahiko Sugimoto, Saitama (JP); Yousuke Naruse, Saitama (JP); Kosuke Irie, Saitama (JP)

(73) Assignee: FUJIFILM Corporation, Tokyo (JP)

(*) Notice: Subject to any disclaimer, the term of this patent is extended or adjusted under 35 U.S.C. 154(b) by 0 days.

(21) Appl. No.: 14/989,336

(22) Filed: Jan. 6, 2016

(65) Prior Publication Data

US 2016/0117806 A1     Apr. 28, 2016

Related U.S. Application Data

(63) Continuation of application No. PCT/JP2014/066497, filed on Jun. 23, 2014.

(30) Foreign Application Priority Data

Jul. 25, 2013  (JP) .................. 2013-154973

(51) Int. Cl.
| | |
|---|---|
| G06K 9/68 | (2006.01) |
| G06T 5/00 | (2006.01) |
| H04N 5/235 | (2006.01) |
| G06K 9/46 | (2006.01) |
| G06K 9/62 | (2006.01) |

(52) U.S. Cl.
CPC ............ *G06T 5/003* (2013.01); *G06K 9/4661* (2013.01); *G06K 9/6215* (2013.01);
(Continued)

(58) Field of Classification Search
CPC ...................... G06T 5/003; G06T 5/20; G06T 2207/20024; G06T 2207/20201;
(Continued)

(56) References Cited

U.S. PATENT DOCUMENTS

| | | | | |
|---|---|---|---|---|
| 7,990,438 | B2* | 8/2011 | Kamo | G02B 7/102 348/208.11 |
| 8,482,627 | B2* | 7/2013 | Sekine | H04N 5/217 348/208.12 |

(Continued)

FOREIGN PATENT DOCUMENTS

| | | |
|---|---|---|
| JP | 2011-59813 A | 3/2011 |
| JP | 2012-49759 A | 3/2012 |
| JP | 2013-20610 A | 1/2013 |

OTHER PUBLICATIONS

English translation of Written Opinion of the International Searching Authority, issued in PCT/JP2014/066497, dated Sep. 16, 2014.

(Continued)

*Primary Examiner* — Ali Bayat
(74) *Attorney, Agent, or Firm* — Birch, Stewart, Kolasch & Birch, LLP

(57) ABSTRACT

Source image data is subjected to a logarithmic process (gamma correction process) (S11), and the luminance distribution of source image data is acquired (S12). Then, it is determined whether or not the luminance distribution of source image data corresponds to "a high luminance scene (highlight scene) biased toward a high luminance side" based on a characteristic of a luminance value equal to or greater than a first threshold value in the luminance distribution of source image data (S13). According to the determination result (Y/N of S13), a restoration process based on a point spread function of an optical system is controlled (S14, S15). A restoration filter which is used in the restoration process has a filter coefficient corresponding to image data before the logarithmic process.

20 Claims, 33 Drawing Sheets

(52) U.S. Cl.
CPC . *H04N 5/2353* (2013.01); *G06T 2207/20024* (2013.01); *G06T 2207/20192* (2013.01); *G06T 2207/20201* (2013.01)

(58) Field of Classification Search
CPC . G06T 2207/20192; G06T 2207/10024; G06T 2207/10016; G06T 2207/10052; G06K 9/4661; G06K 9/6215; H04N 13/0217; H04N 13/0257; H04N 1/58
See application file for complete search history.

(56) References Cited

U.S. PATENT DOCUMENTS

| | | | | |
|---|---|---|---|---|
| 8,514,304 | B2 * | 8/2013 | Hatakeyama | G06T 5/003 348/222.1 |
| 8,692,909 | B2 * | 4/2014 | Hatakeyama | G06T 5/003 348/222.1 |
| 8,941,762 | B2 * | 1/2015 | Hatakeyama | H04N 1/58 348/241 |
| 8,982,234 | B2 * | 3/2015 | Sekine | H04N 5/217 348/208.99 |
| 2012/0320240 | A1 | 12/2012 | Kano | |

OTHER PUBLICATIONS

International Search Report, issued in PCT/JP2014/066497, dated Sep. 16, 2014.
Written Opinion of the International Searching Authority, issued in PCT/JP2014/066497, dated Sep. 16, 2014.

* cited by examiner

FIG. 11

| | BEFORE/AFTER GRADATION CORRECTION | | COLOR DATA /LUMINANCE DATA | |
|---|---|---|---|---|
| | ANTILOGARITHM (BEFORE GRADATION CORRECTION) | LOGARITHM (AFTER GRADATION CORRECTION) | COLOR DATA (RGB) | LUMINANCE DATA (Y) |
| RESTORABILITY IN IDEAL SYSTEM | A | B | A | B |
| LUMINANCE SYSTEM TOUGHNESS IN SYSTEM DEVIATED FROM IDEAL SYSTEM (RINGING DEGREE OR THE LIKE) | B | A | – | – |
| COLOR SYSTEM CORRECTION ABILITY | – | – | A | – |
| COLOR SYSTEM TOUGHNESS IN SYSTEM DEVIATED FROM IDEAL SYSTEM (COLORING DEGREE, BLURRING DEGREE, OR THE LIKE) | – | – | B CONSPICUOUS | CURRENT SITUATION CONTINUES |
| PROCESSING SCALE | B 2-BYTE SYSTEM | A 8bit | B 3ch | A 1ch |

A: EFFECT IS GREAT
B: EFFECT IS SMALL TO INTERMEDIATE
–: NO CORRESPONDENCE OR NO CHANGE

SCENERY PHOTOGRAPHING MODE

PORTRAIT PHOTOGRAPHING MODE

IMAGE PROCESSING DEVICE, IMAGE CAPTURE DEVICE, IMAGE PROCESSING METHOD, AND PROGRAM

CROSS-REFERENCE TO RELATED APPLICATIONS

This application is a Continuation of PCT International Application No. PCT/JP2014/066497 filed on Jun. 23, 2014, which claims priority under 35 U.S.C §119(a) to Patent Application No. 2013-154973 filed in Japan on Jul. 25, 2013, all of which are hereby expressly incorporated by reference into the present application.

BACKGROUND OF THE INVENTION

1. Field of the Invention

The present invention relates to an image processing device, an image capture device, an image processing method, and a program regarding a restoration process based on a point spread function.

2. Description of the Related Art

In an object image photographed through an image capture optical system, a so-called point spread phenomenon in which a point object has minute spread due to the influence of diffraction, aberration, or the like caused by the image capture optical system may be observed. A function representing a response to a point light source of an optical system is called a point spread function (PSF), and is known as a parameter responsible for resolution deterioration (blurring) of a photographic image.

The photographic image deteriorated in image quality due to the point spread phenomenon can be recovered in image quality through a point image restoration process based on the PSF. The point image restoration process is a process in which a deterioration characteristic (point image characteristic) caused by aberration or the like of a lens (optical system) is determined in advance, and point spread of the photographic image is cancelled through an image process using a restoration filter (recovery filter) according to the point image characteristic.

Various methods for the point image restoration process have been suggested, and for example, JP2011-059813A discloses an image processing device which performs image recovery for an image subjected to nonlinear correction using blind deconvolution. This image processing device includes a correction unit which performs correction for reducing nonlinear gradation correction for a photographic image subjected to nonlinear gradation correction, and an image recovery unit which performs image recovery by applying blind deconvolution to the photographic image with reduced gradation correction.

JP2013-020610A discloses an image processing device which reduces over-recovery of image data by an image recovery process. In this image processing device, an image recovery process is performed for color image data in an RGB format before a gamma process, the difference between amplification and attenuation of a pixel signal value by gamma correction is absorbed, and a limit value of a variation is calculated such that the maximum value of the variation of the pixel signal value becomes constant even after gamma correction. With this, the technical problems in that "a situation in which a deterioration state of image data actually obtained does not match a deterioration state of image data to be recovered by an image recovery filter occurs due to a saturated pixel", and "image quality deterioration, such as undershoot or overshoot, occurs in an edge portion, and in particular, undershoot in a low luminance portion is amplified by a gamma process after an image recovery process" have been solved.

The point spread function of the optical system is used in a restoration technique of an image with an extended depth of focus, and JP2012-049759A discloses an image capture module which executes image restoration in a short period of time with excellent accuracy. In this photographing module, a restoration process is applied to a luminance signal after a synchronization process (demosaic process), whereby it is not necessary to separately provide parameters of the restoration process for RGB, and it is possible to accelerate the restoration process. Furthermore, adjacent pixels are put together in a predetermined unit and the common restoration process parameter is applied to this unit to perform a deconvolution process, whereby the accuracy of the restoration process is improved.

SUMMARY OF THE INVENTION

The above-described point image restoration process is a process for restoring an image blurred due to an image capture optical characteristic, such as the point spread phenomenon by the optical system, to an original sharp image, and is a technique for acquiring a recovered image with image quality deterioration eliminated by applying the restoration filter based on the point spread function to source image data with deteriorated image quality.

Accordingly, in order to obtain a recovered image in which an object image is faithfully reproduced, "the characteristic of the restoration filter" for use in the point image restoration process needs to appropriately match "image quality deterioration of source image data".

That is, if image quality deterioration caused by an optical system is exactly understood, a restoration filter capable of strictly eliminating such image quality deterioration is designed, and image quality deterioration due to the optical system, such as the point spread phenomenon, is accurately reflected in source image data, in principle, it is possible to obtain "a high-quality image in which an object image is faithfully reproduced" from "a photographic image with deteriorated image quality".

However, "the characteristic of the restoration filter" may not appropriately match "image quality deterioration of source image data" depending on the characteristic of the object image or photographing equipment.

For example, source image data fluctuates in image quality depending on the image capture ability of the image capture element, and in case where the object image is very bright, a pixel saturation phenomenon may occur in the image capture element. In case where pixel saturation occurs, saturated pixel data, that is, a saturated pixel value is clipped or the like; thus, the obtained source image data does not always reproduce the object image faithfully.

In this way, source image data to be subjected to the restoration process is affected by not only the deterioration characteristic resulting from the optical system but also the deterioration characteristic resulting from the image capture element, and in particular, in case where the contrast of the object image is great, unexpected image quality deterioration may occur.

Accordingly, even if the characteristics of the optical system are sufficiently analyzed and a restoration filter capable of suppressing the influence of the point spread phenomenon is designed, "the characteristic of the restoration filter" may not appropriately match "image quality deterioration of source image data" depending on the object image.

If the restoration process is performed under a condition that "the characteristic of the restoration filter" may not appropriately match "image quality deterioration of source image data", image quality deterioration is not sufficiently eliminated, and a high-quality recovered image is not obtained. In some cases, image quality deterioration is promoted, and ringing or the like is conspicuous in a recovered image.

The degree of image quality deterioration, such as ringing, occurring in the recovered image depends on various factors. For example, the image quality of the recovered image after the point image restoration process fluctuates due to the characteristic of the restoration filter for use in the restoration process, the data characteristic of source image data, to which the restoration process is applied, or other image processes performed before and after the restoration process. Accordingly, in order to more effectively prevent or reduce image quality deterioration in the recovered image, a restoration process method integrally in consideration of various characteristics is required. In particular, when various object images are photographed, an image data characteristic to be subjected to the restoration process is not constant, and various images, such as an image having great contrast as a whole or locally, a color-shifted image, and/or an image with some pixel values in a saturated state, will be subjected to the restoration process. Therefore, a restoration process method which is excellent in image toughness to flexibly cope with an image to be processed having various characteristics is required.

However, in JP2011-059813A, JP2013-020610A, and JP2012-049759A described above, there is no description of the above-described problems, and there is no suggestion relating to "an image processing method which integrally considers various factors in the processes before and after the restoration process as well as the restoration process itself in the restoration process using the point spread function and is excellent in image toughness to flexibly cope with a source image having various characteristics".

If the point image restoration process is performed in a state where the deviation of matching between "the characteristic of the restoration filter" and "image quality deterioration of source image data" is great, image quality degradation, such as overcorrection, may occur. For this reason, the point image restoration process for image data subjected to gradation correction, such as gamma correction, is excellent in image toughness, and may cause image quality deterioration due to overcorrection or the like.

The gradation correction, such as gamma correction, is a process for changing the characteristic of image data; thus, the deviation of matching between "image data after gamma correction" and "the point spread function of the optical system used for photographing" becomes comparatively great. In particular, on a high luminance side (highlight side) rather than a low luminance side, the deviation of matching between "image data after gamma correction" and "the point spread function of the optical system" is likely to become great. Accordingly, in case where image data inclines toward the high luminance side to be bright as a whole by the influence of a photographing scene or the like, the proportion of a high luminance region in the entire image increases, and the deviation of matching between "image data after gamma correction" and "the point spread function of the optical system" becomes great. For this reason, in case where image data is deviated to the high luminance side, on which image data is bright as a whole, by the influence of the photographing scene or the like, "a region where image quality is deteriorated due to overcorrection by the point image restoration process" is extended in the recovered image.

The invention has been accomplished in consideration of the above-described situation, and an object of the invention is to provide a technique for performing a restoration process based on a point spread function with excellent accuracy while suppressing "image quality deterioration due to brightness of an object image" or "image quality deterioration due to photographing conditions responsible for brightness of a photographic image".

An aspect of the invention relates to an image processing device which subjects source image data acquired by photographing an object image using an optical system to a restoration process using a restoration filter based on a point spread function of the optical system to acquire recovered image data. The image processing device includes a gradation correction unit which subjects the source image data to gradation correction by a logarithmic process, a restoration processing unit which performs the restoration process by applying the restoration filter having a filter coefficient corresponding to image data before the logarithmic process to the source image data subjected to the gradation correction, a luminance distribution acquisition unit which acquires the luminance distribution of the source image data, and a restoration control unit which controls the restoration process by controlling the restoration processing unit based on a characteristic of a luminance value equal to or greater than a first threshold value in the luminance distribution.

According to this aspect, it is possible to perform restoration process control according to the luminance distribution of the source image data. In particular, since the restoration process control reflecting the characteristic of the luminance value equal to or greater than the first threshold value in the luminance distribution is performed, it is possible to perform the restoration process based on the point spread function with excellent accuracy while effectively suppressing image quality deterioration (overcorrection or the like) due to brightness of the object image.

The "logarithmic process" used herein is a process for converting data expressed by antilogarithm to data expressed by logarithm, and in this aspect, further includes, for example, a gamma correction process which is performed for image data. Furthermore, "the filter coefficient corresponding to image data before the logarithmic process" is a filter coefficient which is derived based on image data before the logarithmic process including the gamma correction process, and corresponds to image data expressed by antilogarithm.

In addition, the "luminance distribution" and the "luminance value" are indexes which represent brightness of an image directly or indirectly. For example, the "luminance distribution" and the "luminance value" may be determined based on a "luminance signal component" in case where image data is represented by a luminance signal and a color difference signal (YCbCr color space or the like), or a "lightness dimensional component" in case where image data is represented by a lightness dimension and a color-opponent dimension (L*a*b*). Furthermore, the "luminance distribution" and the "luminance value" may be determined based on a color component which can be an indirect index of brightness of the image, and for example, the "luminance distribution" and the "luminance value" may be determined based on a color component which can contribute most to brightness of the image among the color components of image data.

Preferably, the restoration control unit determines whether or not the source image data satisfies a first luminance state based on the luminance distribution, and in case where the source image data satisfies the first luminance state, lowers the restoration intensity of the restoration process compared to in case where the source image data does not satisfy the first luminance state, or does not subject the source image data to the restoration process by controlling the restoration processing unit.

According to this aspect, it is possible to control the restoration process according to whether or not the first luminance state is satisfied. In particular, the "first luminance state" is determined based on "an image quality deterioration element due to brightness of the object image" in image quality deterioration which can be caused by the restoration process based on the point spread function, whereby it is possible to perform the restoration process based on the point spread function with excellent accuracy while effectively suppressing image quality deterioration due to brightness of the object image.

Preferably, in case where the source image data satisfies the first luminance state, the restoration control unit does not subject the source image data to the restoration process and subjects the source image data to a blur image correction process different from the restoration process based on the point spread function of the optical system by controlling the restoration processing unit.

According to this aspect, in case where the source image data satisfies the first luminance state, instead of the restoration process based on the point spread function, a blur image correction process different from the restoration process based on the point spread function is performed for the source image data. In this case, the "first luminance state" is determined in consideration of "an image quality deterioration element due to brightness of the object image", whereby it is possible to effectively avoid "image quality deterioration due to brightness of the object image" which can be caused by the restoration process based on the point spread function, to reduce blur of source image data through the blur image correction process, and to obtain high-definition recovered image data.

The "blur image correction process" used herein is an image process not based on the point spread function, and can include various processes capable of reducing blur of the image. The blur image correction process is not particularly limited, and is a process in which an image artifact, such as ringing, is not caused or is hardly caused.

Preferably, the blur image correction process is a contour enhancement process.

According to this aspect, even if the restoration process based on the point spread function is not performed, it is possible to obtain high-definition recovered image data through the contour enhancement process. The "contour enhancement process" is, for example, a process for making a concentration gradient of a contour portion of an image steep to obtain a sharp image, and can include an image process for enhancing a high frequency component of an image to be processed.

Preferably, the restoration control unit determines that the source image data satisfies the first luminance state in case where a luminance value indicating the peak of the frequency in the luminance distribution indicating the frequency per luminance of pixels constituting the source image data is equal to or greater than the first threshold value.

According to this aspect, it is possible to simply determine whether or not the source image data satisfies the first luminance state based on "the luminance value indicating the frequency peak in the luminance distribution of the source image data". Accordingly, the "first threshold value" is determined based on "the image quality deterioration element due to brightness of the object image" in image quality deterioration which can be caused by the restoration process based on the point spread function, whereby it is possible to perform the restoration process based on the point spread function with excellent accuracy while effectively suppressing image quality deterioration due to brightness of the object image. For example, the "first threshold value" used herein can be set based on a luminance value which is about 80% of the highest luminance value expressible in the source image data.

Preferably, the restoration control unit determines that the source image data satisfies the first luminance state in case where the proportion of pixels having a luminance value equal to or greater than the first threshold value in the luminance distribution indicating the frequency per luminance of pixels constituting the source image data is equal to or greater than a second threshold value.

According to this aspect, it is possible to simply determine whether or not the source image data satisfies the first luminance state based on "the proportion of the pixels having the luminance value equal to or greater than the first threshold value in the luminance distribution of the source image data". Accordingly, the "first threshold value" and the "second threshold value" are determined based on "the image quality deterioration element due to brightness of the object image" in image quality deterioration which can be caused by the restoration process based on the point spread function, whereby it is possible to perform the restoration process based on the point spread function with excellent accuracy while effectively suppressing image quality deterioration due to brightness of the object image. For example, the "first threshold value" used herein can be set based on the luminance value which is about 80% of the highest luminance value expressible in the source image data. Furthermore, the "second threshold value" used herein can be set based on the number of pixels (pixel proportion) which is about 50% of the number of pixels of the entire image (the number of pixels constituting the source image data).

Preferably, in case where the source image data satisfies the first luminance state, the restoration control unit lowers the restoration intensity of the restoration process by controlling the restoration processing unit and adjusting the filter coefficient of the restoration filter compared to in case where the source image data does not satisfy the first luminance state.

According to this aspect, it is possible to simply lower the restoration intensity with the adjustment of the filter coefficient. The adjustment of the filter coefficient may be performed by individually changing the filter coefficient constituting the restoration filter, or may be performed by switching the restoration filter itself to other types of restoration filters.

Preferably, the restoration processing unit applies the restoration filter to the source image data to acquire restored image data, adjusts an amplification factor of the difference between the source image data and the restored image data to determine a difference value after amplification factor adjustment, and acquires the recovered image data from the difference value after amplification factor adjustment and the source image data, and in case where the source image data satisfies the first luminance state, the restoration control unit lowers the restoration intensity of the restoration process by controlling the restoration processing unit and adjusting the amplification factor compared to in case where the source image data does not satisfy the first luminance state.

According to this aspect, it is possible to simply adjust the restoration intensity with the adjustment of the amplification factor, and to lower the restoration intensity by decreasing the amplification factor.

Another aspect of the invention relates to an image processing device which subjects source image data acquired by photographing an object image using an optical system to a restoration process using a restoration filter based on a point spread function of the optical system to acquire recovered image data. The image processing device includes a gradation correction unit which subjects the source image data to gradation correction by a logarithmic process, a restoration processing unit which performs the restoration process by applying the restoration filter having a filter coefficient corresponding to image data before a logarithmic process to the source image data subjected to the gradation correction, an exposure acquisition unit which acquires a photographing exposure as the exposure of the optical system for acquiring the source image data, and a restoration control unit which controls the restoration process by controlling the restoration processing unit based on the photographing exposure.

According to this aspect, it is possible to perform the restoration process control according to the "photographing exposure" which is a photographing condition responsible for brightness of the photographic image. Accordingly, it is possible to perform the restoration process based on the point spread function with excellent accuracy while effectively suppressing image quality deterioration due to the exposure which is the photographing condition responsible for brightness of the photographic image.

The "photographing exposure" used herein is the exposure of the optical system for acquiring the source image data, and can fluctuate according to the photographing conditions (a combination of a diaphragm value (F value) and a shutter speed) at the time of acquiring the source image data.

Preferably, the restoration control unit controls the restoration process by controlling the restoration processing unit based on the difference between a proper exposure and the photographing exposure.

According to this aspect, it is possible to effectively suppress image quality deterioration due to the photographing conditions responsible for brightness of the photographic image based on the magnitude of the photographing exposure with respect to the proper exposure.

The proper exposure can be acquired by an arbitrary method, a proper exposure having a value determined in advance may be used, and a proper exposure may be appropriately calculated according to the source image data, the photographing conditions, or the like.

Preferably, the optical system has a lens unit which modulates a phase to extend a depth of field.

According to this aspect, in regard to source image data obtained through an extended depth of field (focus) (EDoF) optical system, it is possible to perform the restoration process based on the point spread function with excellent accuracy while suppressing image quality deterioration due to the photographing conditions responsible for brightness of the object image or brightness of the photographic image. A method (optical phase modulation means) of modulating a phase in the lens unit is not particularly limited, and a phase modulation unit may be provided between lenses, or a lens itself (for example, an incidence surface and/or an output surface of a lens) may have a phase modulation function.

Preferably, the restoration processing unit performs the restoration process by applying the restoration filter to a luminance component of the source image data subjected to the gradation correction.

According to this aspect, it is possible to perform the restoration process based on the point spread function with excellent accuracy for the luminance component in the source image data while suppressing image quality deterioration due to the photographing conditions responsible for brightness of the object image or brightness of the photographic image.

Preferably, the restoration processing unit performs the restoration process by applying the restoration filter to a color component of the source image data subjected to the gradation correction.

According to this aspect, it is possible to perform the restoration process based on the point spread function with excellent accuracy for the color component in the source image data while suppressing image quality deterioration due to the photographing conditions responsible for brightness of the object image or brightness of the photographic image.

Still another aspect of the invention relates to an image capture device including an image capture element which acquires source image data by photographing using an optical system, and the above-described image processing device.

Still another aspect of the invention relates to an image processing method which subjects source image data acquired by photographing an object image using an optical system to a restoration process using a restoration filter based on a point spread function of the optical system to acquire recovered image data. The image processing method includes a gradation correction step of subjecting the source image data to gradation correction by a logarithmic process, a restoration processing step of performing the restoration process by applying the restoration filter having a filter coefficient corresponding to image data before the logarithmic process to the source image data subjected to the gradation correction, and a luminance distribution acquisition step of acquiring the luminance distribution of the source image data, and the restoration process is controlled based on a characteristic of a luminance value equal to or greater than a first threshold value in the luminance distribution.

Still another aspect of the invention relates to an image processing method which subjects source image data acquired by photographing an object image using an optical system to a restoration process using a restoration filter based on a point spread function of the optical system to acquire recovered image data. The image processing method includes a gradation correction step of subjecting the source image data to gradation correction by a logarithmic process, a restoration processing step of performing the restoration process by applying the restoration filter having a filter coefficient corresponding to image data before the logarithmic process to the source image data subjected to the gradation correction, and an exposure acquisition step of acquiring a photographing exposure as the exposure of the optical system for acquiring the source image data, and the restoration process is controlled based on the photographing exposure.

Still another aspect of the invention relates to a program which causes a computer to function as means for subjecting source image data acquired by photographing an object image using an optical system to a restoration process using a restoration filter based on a point spread function of the optical system to acquire recovered image data. The program causes the computer to execute a procedure for subjecting the source image data to gradation correction by a logarithmic process, a procedure for performing the restoration process by applying the restoration filter having a filter coefficient corresponding to image data before the logarithmic process to the source image data subjected to the gradation correction, and a procedure for acquiring the luminance distribution of the source image data, and the restoration process is controlled based on a characteristic of a luminance value equal to or greater than a first threshold value in the luminance distribution.

Still another aspect of the invention relates to a program which causes a computer to function as means for subjecting source image data acquired by photographing an object image using an optical system to a restoration process using a restoration filter based on a point spread function of the optical system to acquire recovered image data. The program causes the computer to execute a procedure for subjecting the source image data to gradation correction by a logarithmic process, a procedure for performing the restoration process by applying the restoration filter having a filter coefficient corresponding to image data before the logarithmic process to the source image data subjected to the gradation correction, and a procedure for acquiring a photographing exposure as the exposure of the optical system for acquiring the source image data, and the restoration process is controlled based on the photographing exposure.

According to an aspect of the invention, the restoration process based on the point spread function is controlled based on "the characteristic of the luminance value equal to or greater than the first threshold value" among the characteristics of the source image data, and it is possible to perform the restoration process with excellent accuracy while effectively suppressing image quality deterioration due to brightness of the object image.

According to another aspect of the invention, the restoration process based on the point spread function is controlled based on "the exposure (photographing exposure) of the optical system" for acquiring the source image data, and it is possible to perform the restoration process with excellent accuracy while effectively suppressing image quality deterioration due to the photographing conditions responsible for brightness of the photographic image.

BRIEF DESCRIPTION OF THE DRAWINGS

FIG. 11 is a diagram showing the correlation of the "gradation correction process (gamma correction process)" and "color data/luminance data" for the point image restoration process.

DESCRIPTION OF THE PREFERRED EMBODIMENTS

An embodiment of the invention will be described referring to the accompanying drawings. In the following embodiment, as an example, a case where the invention is applied to a digital camera (image capture device) which is connectable to a computer (personal computer (PC)) will be described.

Figure 1:
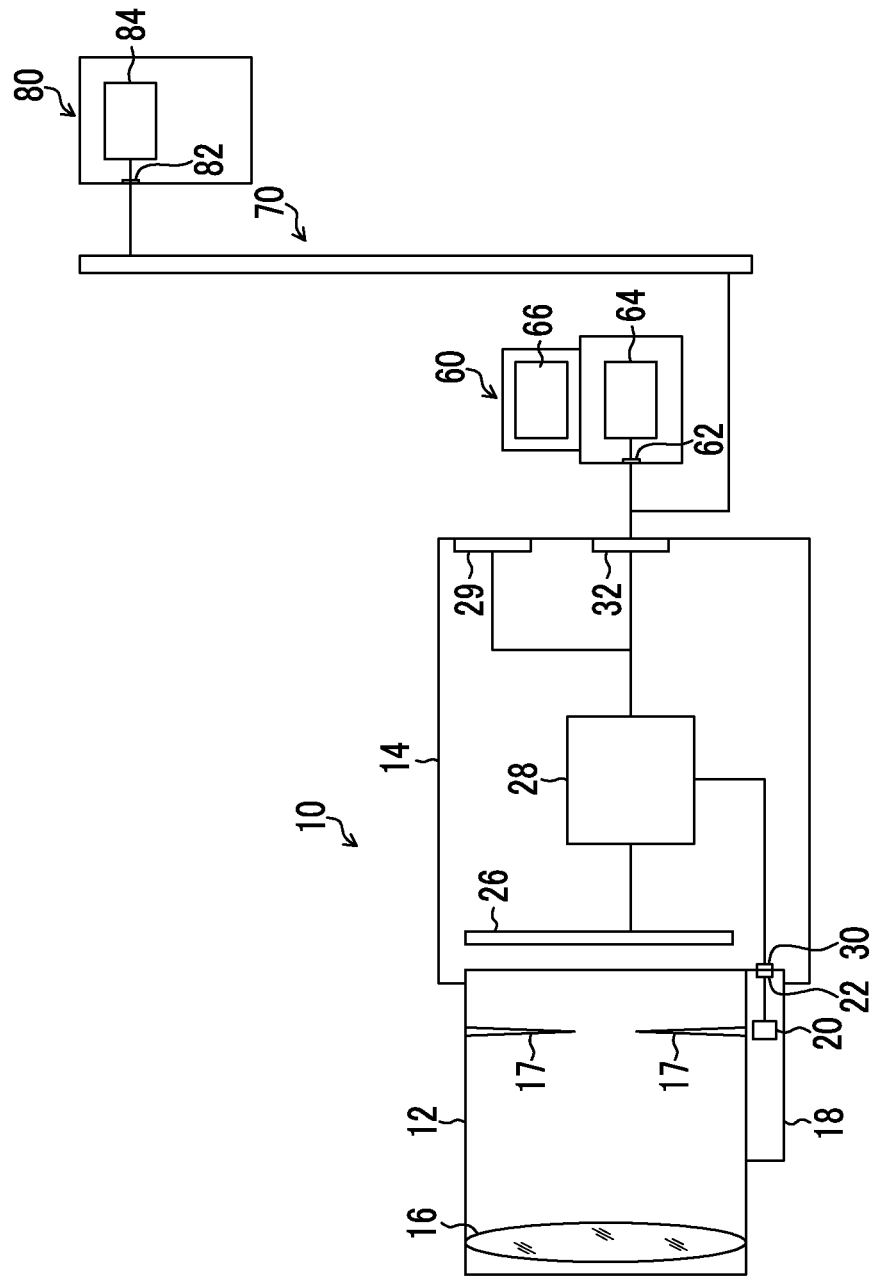
FIG. 1 is a block diagram showing a digital camera which is connected to a computer.

FIG. 1 is a block diagram showing a digital camera which is connected to a computer.

A digital camera 10 includes an interchangeable lens unit 12, and a camera body 14 including an image capture element 26, and the lens unit 12 and the camera body 14 are electrically connected through a lens unit input/output unit 22 of the lens unit 12 and a camera body input/output unit 30 of the camera body 14.

The lens unit 12 includes an optical system, such as a lens 16 or a diaphragm 17, and an optical system operating unit 18 which controls the optical system. The optical system operating unit 18 includes a lens unit controller 20 which is connected to the lens unit input/output unit 22, and an actuator (not shown) which operates the optical system. The lens unit controller 20 controls the optical system through an actuator based on a control signal sent from the camera body 14 through the lens unit input/output unit 22, and performs, for example, focus control or zoom control by lens movement, diaphragm amount control of the diaphragm 17, and the like.

The image capture element 26 of the camera body 14 has a condensing microlens, a color filter of RGB or the like, and an image sensor (a photodiode: a complementary metal oxide semiconductor (CMOS), a charge coupled device (CCD), or the like). The image capture element 26 converts light of an object image emitted through the optical system (the lens 16, the diaphragm 17, or the like) of the lens unit 12 to an electrical signal, and sends an image signal (source image data) to the camera body controller 28.

The image capture element 26 of this example outputs source image data through photographing of the object image using the optical system, and source image data is transmitted to an image processing unit of the camera body controller 28.

Figure 2:
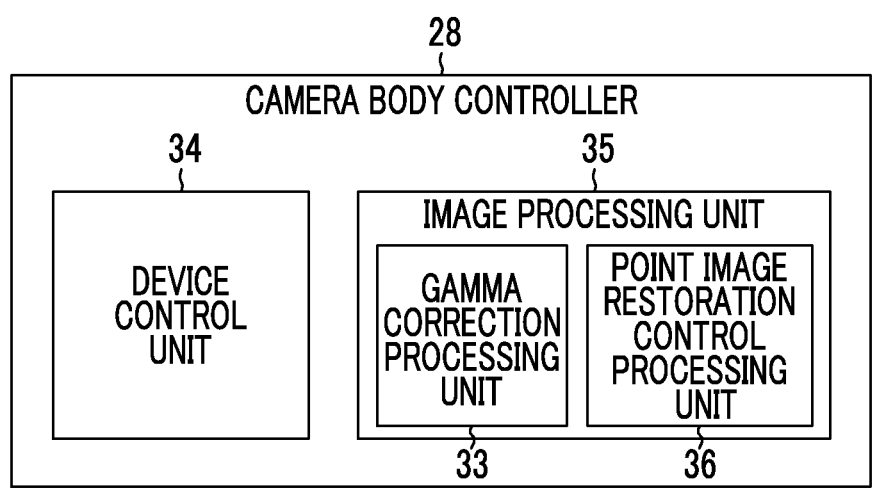
FIG. 2 is a block diagram showing a functional configuration example of a camera body controller.

As shown in FIG. 2, the camera body controller 28 has a device control unit 34 and an image processing unit (image processing device) 35, and integrally controls the camera body 14. For example, the device control unit 34 controls the output of the image signal (image data) from the image capture element 26, generates a control signal for controlling the lens unit 12 and transmits the control signal to the lens unit 12 (lens unit controller 20) through the camera body input/output unit 30, and transmits image data (RAW data, JPEG data, and the like) before and after an image process to external devices (a computer 60 and the like) connected through an input/output interface 32. The device control unit 34 appropriately controls various devices in the digital camera 10, such as a display unit (not shown) (an electronic view finder (EVF) or a rear liquid crystal display unit).

The image processing unit 35 can subject an image signal from the image capture element 26 to an arbitrary image process as necessary. For example, various image processes, such as a sensor correction process, a demosaic (synchronization) process, a pixel interpolation process, a color correction process (an offset correction process, a white balance process, a color matrix process, a gamma conversion process (a gamma correction processing unit 33), and the like), an RGB image process (a sharpness process, a tone correction process, an exposure correction process, a contour correction process, and the like), an RGB/YCrCb conversion process, and an image compression process, are appropriately performed in the image processing unit 35. In particular, the image processing unit 35 of this example includes a point image restoration control processing unit 36 which subjects the image signal (source image data) to the restoration process (point image restoration process) based on the point spread function of the optical system. The details of the point image restoration process will be described below.

The digital camera 10 shown in FIG. 1 includes other devices (a shutter and the like) necessary for photographing or the like, and the user can appropriately determine and change various settings (exposure value (EV value) and the like) for photographing through a user interface 29 in the camera body 14. The user interface 29 is connected to the camera body controller 28 (the device control unit 34 and the image processing unit 35), and various settings determined and changed by the user are reflected in various processes in the camera body controller 28.

Image data subjected to the image process in the camera body controller 28 is sent to the computer 60 and the like through the input/output interface 32. The format of image data sent from the digital camera 10 (camera body controller 28) to the computer 60 and the like is not particularly limited, and may be arbitrarily format, such as RAW, JPEG or TIFF. Accordingly, the camera body controller 28 may constitute a plurality of pieces of associated data, such as header information (photographing information (photographing date and time, model, pixel number, diaphragm value, and the like)), main image data, and thumbnail image data, as one image file in association with one another, like a so-called exchangeable image file format (Exif), and may transmit the image file to the computer 60.

The computer 60 is connected to the digital camera 10 through the input/output interface 32 of the camera body 14 and a computer input/output unit 62, and receives data, such as image data, sent from the camera body 14. A computer controller 64 integrally controls the computer 60, and subjects image data from the digital camera 10 to an image process or performs communication control with a server 80 or the like connected to the computer input/output unit 62 through a network line, such as the Internet 70. The computer 60 has a display 66, and the process content in the computer controller 64 is displayed on the display 66 as necessary. The user operates input means (not shown), such as a keyboard, while confirming the display of the display 66, thereby inputting data or commands to the computer controller 64. With this, the user can control the computer 60 or the devices (the digital camera 10 and the server 80) connected to the computer 60.

The server 80 has a server input/output unit 82 and a server controller 84. The server input/output unit 82 constitutes a transmission/reception connection unit with the external devices, such as the computer 60, and is connected to the computer input/output unit 62 of the computer 60 through the network line, such as the Internet 70. The server controller 84 cooperates with the computer controller 64 according to a control instruction signal from the computer 60, performs transmission/reception of data with the computer controller 64 as necessary, downloads data to the computer 60, and performs a calculation process and transmits the calculation result to the computer 60.

Each controller (the lens unit controller 20, the camera body controller 28, the computer controller 64, and the server controller 84) includes circuits necessary for a control process, and includes, for example, an arithmetic processing circuit (CPU or the like), a memory, and the like. Communication among the digital camera 10, the computer 60, and the server 80 may be performed in a wired manner or in a wireless manner. The computer 60 and the server 80 may be constituted integrally, and the computer 60 and/or the server 80 may be omitted. A communication function with the server 80 may be provided in the digital camera 10, and transmission and reception of data may be performed directly between the digital camera 10 and the server 80.

<Point Image Restoration Process>

Next, a point image restoration process of captured data (image data) of an object image obtained through the image capture element 26 will be described.

In the following example, although an example where the point image restoration process is carried out in the camera body 14 (the camera body controller 28) will be described, the whole or a part of the point image restoration process can be carried out in another controller (the lens unit controller 20, the computer controller 64, the server controller 84, or the like).

The point image restoration process is a process which subjects source image data acquired from the image capture element 26 by photographing the object image using the optical system (the lens 16, the diaphragm 17, or the like) to a restoration process using a restoration filter based on a point spread function of the optical system to acquire recovered image data.

Figure 3:
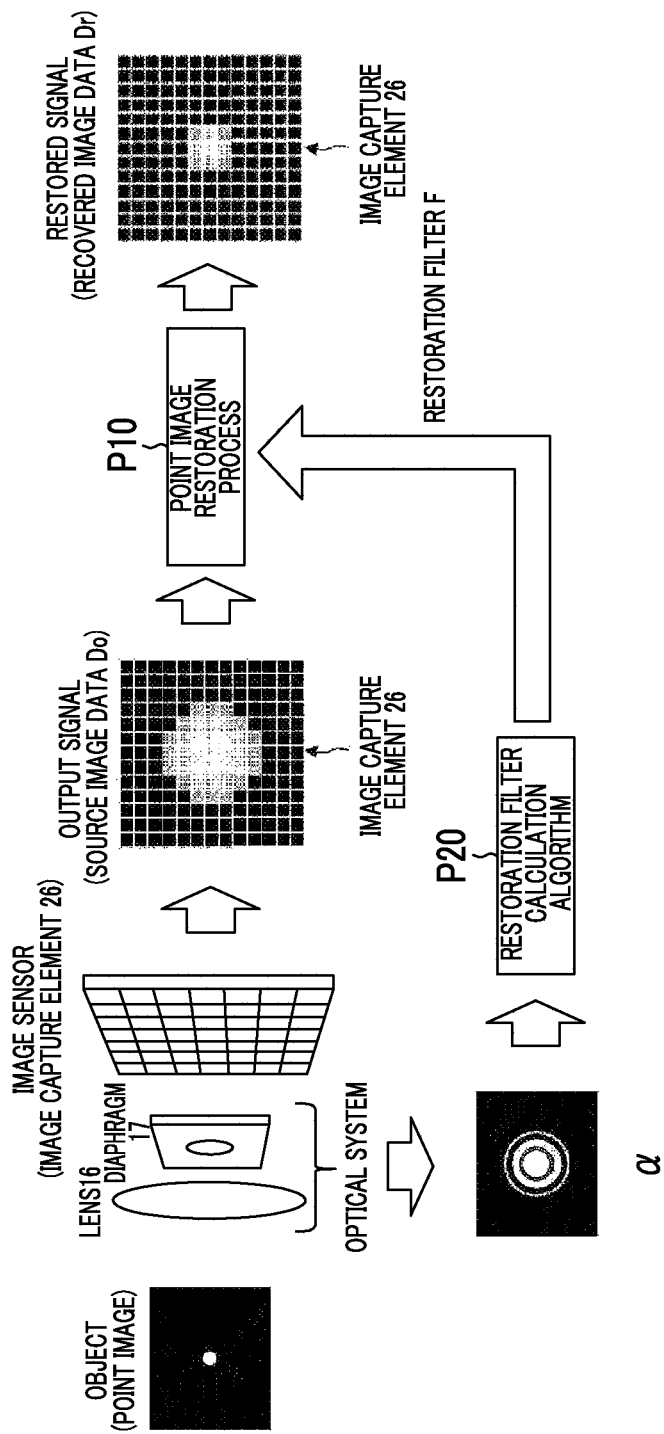
FIG. 3 is a diagram showing an outline from image photographing to a point image restoration process.

FIG. 3 is a diagram showing an outline from image photographing to the point image restoration process. When photographing is performed with a point image as an object, an object image is received by the image capture element 26 (image sensor) through the optical system (the lens 16, the diaphragm 17, or the like), and source image data Do is output from the image capture element 26. Source image data Do becomes image data, in which an original object image is in a blurred state, by a point spread phenomenon resulting from the characteristic of the optical system.

In order to restore the original object image (point image) from source image data Do of the blurred image, source image data Do is subjected to a point image restoration process P10 using a restoration filter F, whereby recovered image data Dr representing an image (recovered image) closer to the original object image (point image) is obtained.

The restoration filter F used for the point image restoration process P10 is obtained from the point spread function, which is point image information of the optical system according to the photographing conditions at the time of acquiring source image data Do, by a predetermined restoration filter calculation algorithm P20. Symbol α in FIG. 3 represents the point image information according to the photographing conditions, and the point spread function as the point image information of the optical system fluctuates depending on various photographing conditions, such as a diaphragm amount, a focal distance, a zoom amount, an image height, a recording pixel number, and a pixel pitch, as well as the type of lens 16; therefore, for calculating the restoration filter F, the photographing conditions are acquired.

Figure 4:
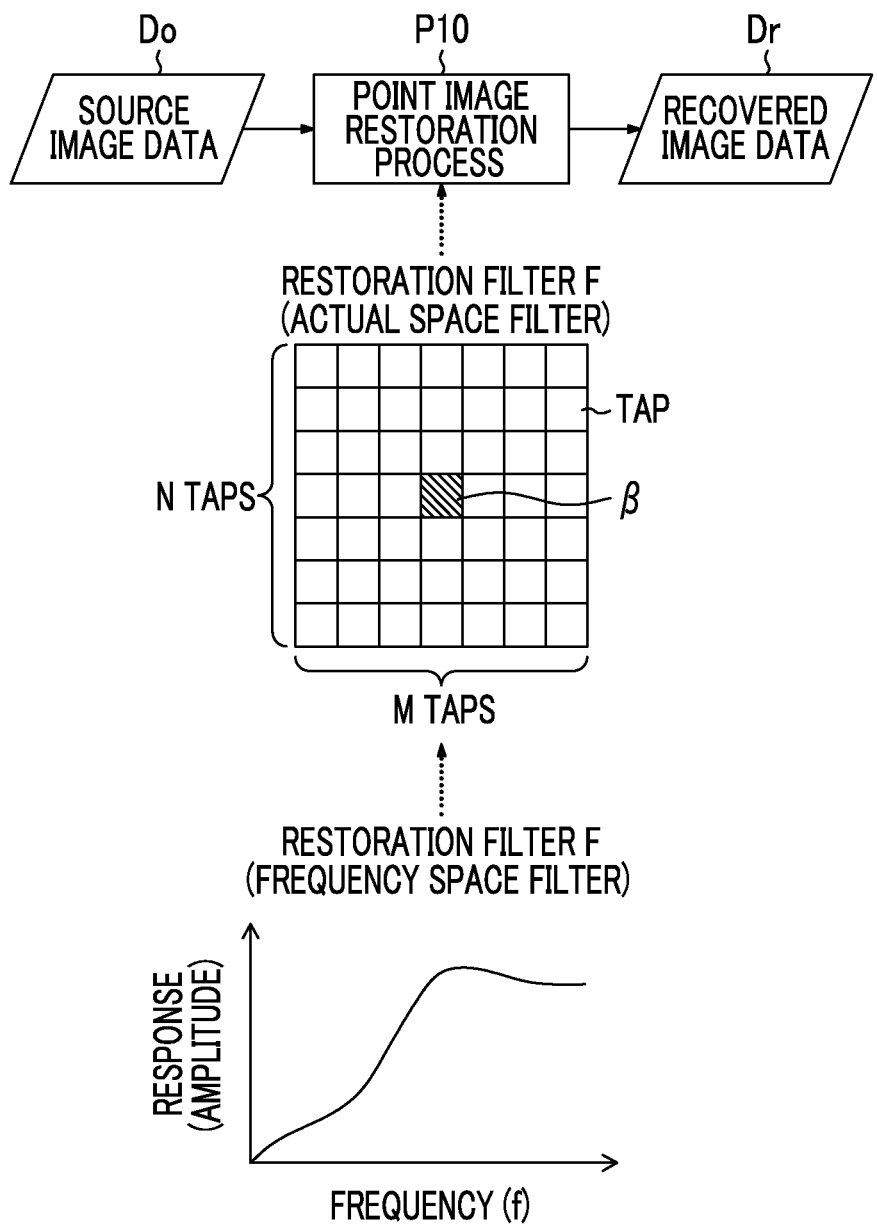
FIG. 4 is a block diagram showing an example of the point image restoration process.

FIG. 4 is a block diagram showing an example of the point image restoration process.

As described above, the point image restoration process P10 is a process which creates recovered image data Dr from source image data Do through a filtering process using the restoration filter F, and the restoration filter F on an actual space constituted of, for example, N ×M (where N and M are integers equal to or greater than two) taps is applied to image data to be processed. With this, weighted average calculation (deconvolution calculation) of a filter coefficient allocated to each tap and corresponding pixel data (pixel data to be processed of source image data Do and adjacent pixel data) is performed, whereby pixel data (recovered image data Dr) after the point image restoration process can be calculated. The weighted average process using the restoration filter F is applied to all pixel data constituting image data while changing a target pixel in order, thereby performing the point image restoration process. Symbol β in FIG. 4 represents a tap (filter coefficient) which is applied to pixel data to be processed.

The restoration filter on the actual space constituted of the N×M taps can be derived by inverse Fourier transform of a restoration filter on a frequency space. Accordingly, the restoration filter on the actual space can be appropriately calculated by specifying a restoration filter on a frequency space as the basis and designating the number of taps constituting the restoration filter of the actual space.

Next, an adverse effect in image quality caused by the point image restoration process will be described.

Figure 5:
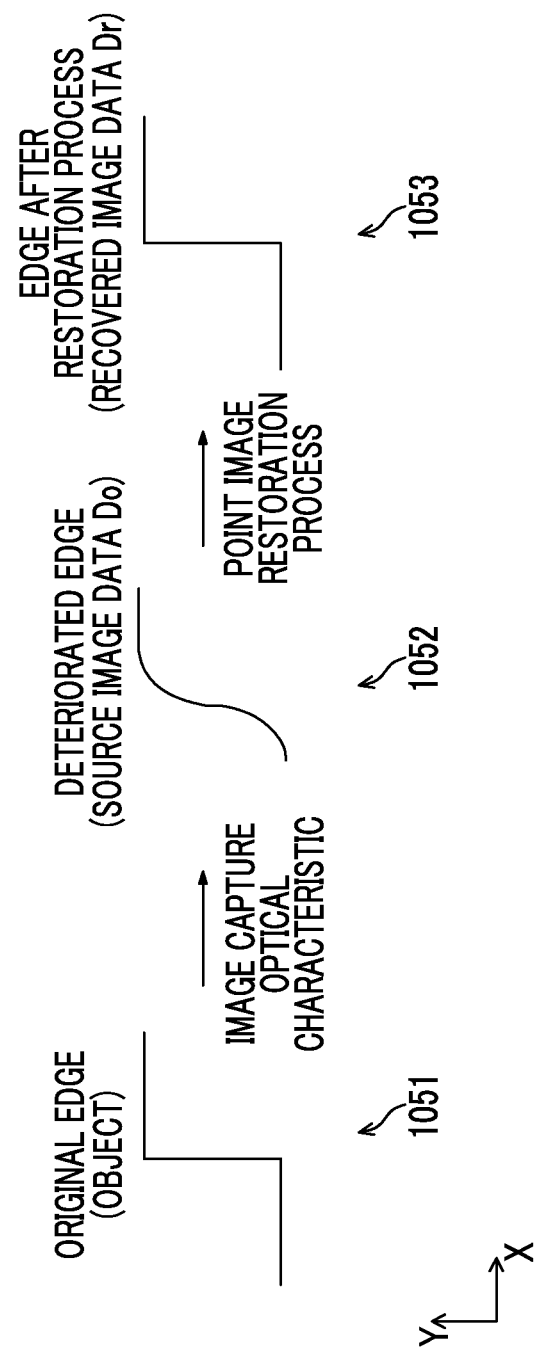
FIG. 5 is a diagram showing an example of a change in image quality of an edge portion (image boundary portion) in an object image, and shows a case where an ideal point image restoration process is performed under a condition that there is no saturation of a pixel value and there is no clipping.

FIG. 5 is a diagram showing an example of a change in image quality of an edge portion (image boundary portion) in an object image, and shows a case where an ideal point image restoration process is performed under a condition that there is no saturation of a pixel value and there is no clipping. Reference numeral 1051 of FIG. 5 indicates contrast inherent in the object image, reference numeral 1052 indicates contrast in source image data Do before the point image restoration process, and reference numeral 1053 indicates contrast in recovered image data Dr after the point image restoration process. The transverse direction (X direction) of FIG. 5 indicates a position (one-dimensional position) in the object image, and the longitudinal direction (Y direction) indicates strength of contrast.

As described above, "an edge portion having a difference in level of contrast" (see reference numeral 1051 of FIG. 5) in the object image has image blur in the photographic image (source image data Do) due to the point spread phenomenon of the optical system at the time of photographing (see reference numeral 1052 of FIG. 5), and recovered image data Dr is obtained through the point image restoration process (see reference numeral 1053 of FIG. 5).

In the point image restoration process, when the "actual image deterioration characteristics (image blur characteristics)" match "the point spread function (PSF or the like) as the basis of the restoration filter to be used", the image is appropriately restored, and recovered image data Dr in which the edge portion or the like is appropriately restored can be obtained (see FIG. 5).

However, in an actual point image restoration process, there may be a case where the "actual image deterioration characteristics (image blur characteristics)" do not completely match "the point spread function as the basis of the restoration filter to be used".

Figure 6:
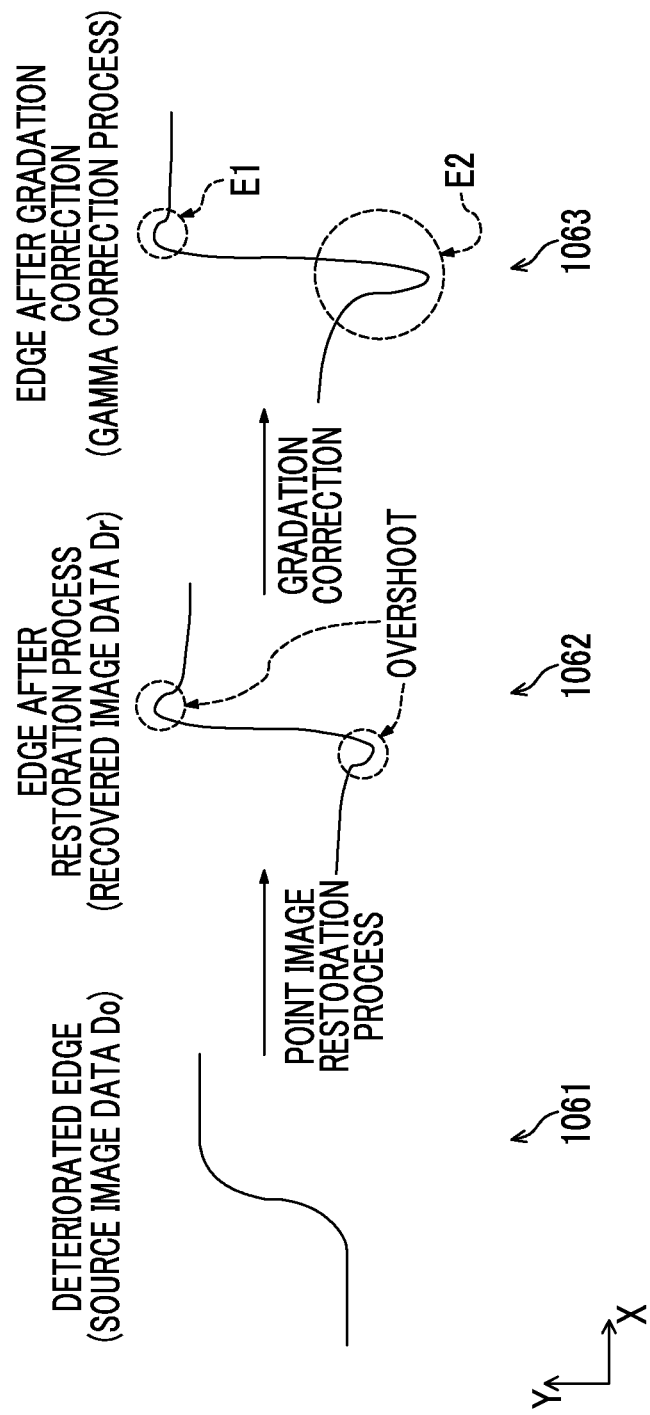
FIG. 6 is a diagram showing an example of source image data, recovered image data, and image data after a gamma correction process when "actual image deterioration characteristics (image blur characteristics)" do not completely match "a point spread function as the basis of a restoration filter to be used".

FIG. 6 is a diagram showing an example of source image data, recovered image data, and image data after the gamma correction process when the "actual image deterioration characteristics (image blur characteristics)" do not completely match "the point spread function as the basis of the restoration filter to be used". The transverse direction (X direction) in FIG. 6 indicates a position (one-dimensional position) in an image, and the longitudinal direction (Y direction) indicates a pixel value. When the "actual image deterioration characteristics (image blur characteristics)" do not completely match "the point spread function as the basis of the restoration filter to be used", overshoot and/or undershoot may occur in the edge portion where a contrast difference is comparatively great (see reference numerals 1061 and 1062 of FIG. 6). Even in a case where image quality deterioration occurs due to overshoot and/or undershoot, as long as the point image restoration process is excellent in image reproducibility and image toughness (image invulnerability), recovered image data Dr in which image quality deterioration is not visually recognized, or image quality is recovered to such an extent so as not to be conspicuous can be acquired.

However, even if recovered image data which has been recovered to such an extent that image quality deterioration is not conspicuous has been obtained through the point image restoration process, image quality deterioration in recovered image data may be enhanced and made conspicuous through other processes (the gradation correction process, such as the gamma correction process) after the point image restoration process.

For example, as shown in FIG. 6, even if overshoot and/or undershoot itself caused by the point image restoration process is small and the influence thereof is not particularly conspicuous visually, and if the gradation correction process, such as the gamma correction process, is performed subsequently, overshoot and/or undershoot may be enhanced more than necessary (see "E1" and "E2" of reference numeral 1063 of FIG. 6). In particular, a great gain (amplification factor) is applied to an undershoot portion on a shadow side through the subsequent gamma correction process, and the undershoot portion constitutes a portion which greatly inclines toward a black side in the image edge portion (see "E2" of reference numeral 1063 of FIG. 6). This phenomenon is not limited to the point image restoration process, and is common for when overshoot occurs in the edge portion as a result of subjecting image data in an antilogarithm space to a contour correction process.

Accordingly, when actually designing the point image restoration process as a part of the image process flow, it is preferable to design an image process flow in consideration of not only the point image restoration process itself but also the relevance to the processes before and after the point image restoration process.

Figure 7:
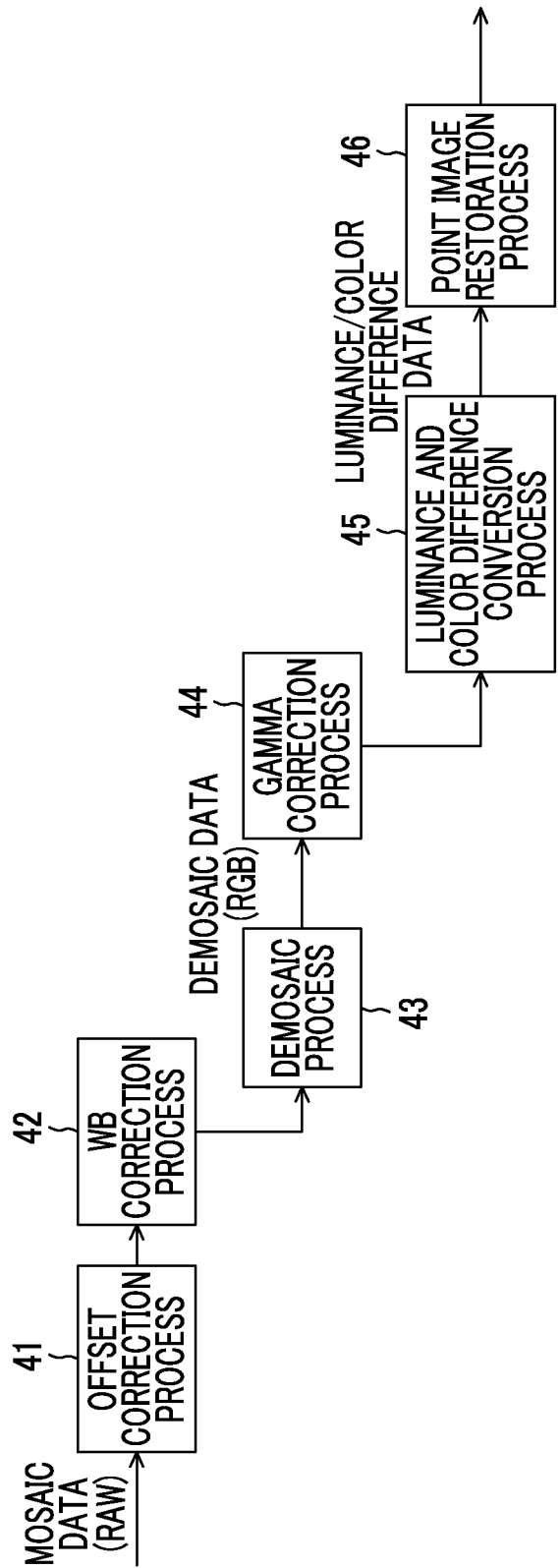
FIG. 7 is a block diagram illustrating an image process flow in an image processing unit, and shows an example where the point image restoration process is performed for luminance data (Y) after the gamma correction process as a gradation correction process.
Figure 8:
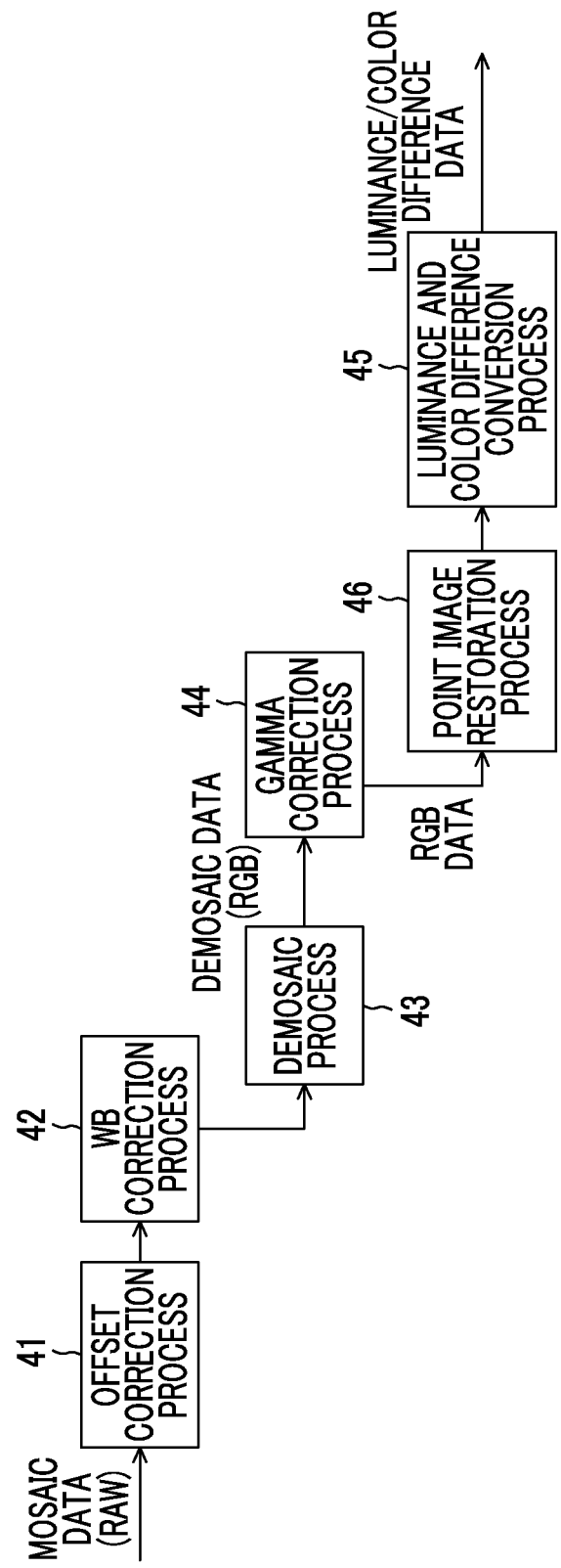
FIG. 8 is a block diagram illustrating the image process flow in the image processing unit, and shows an example where the point image restoration process is performed for RGB color data after the gamma correction process.
Figure 9:
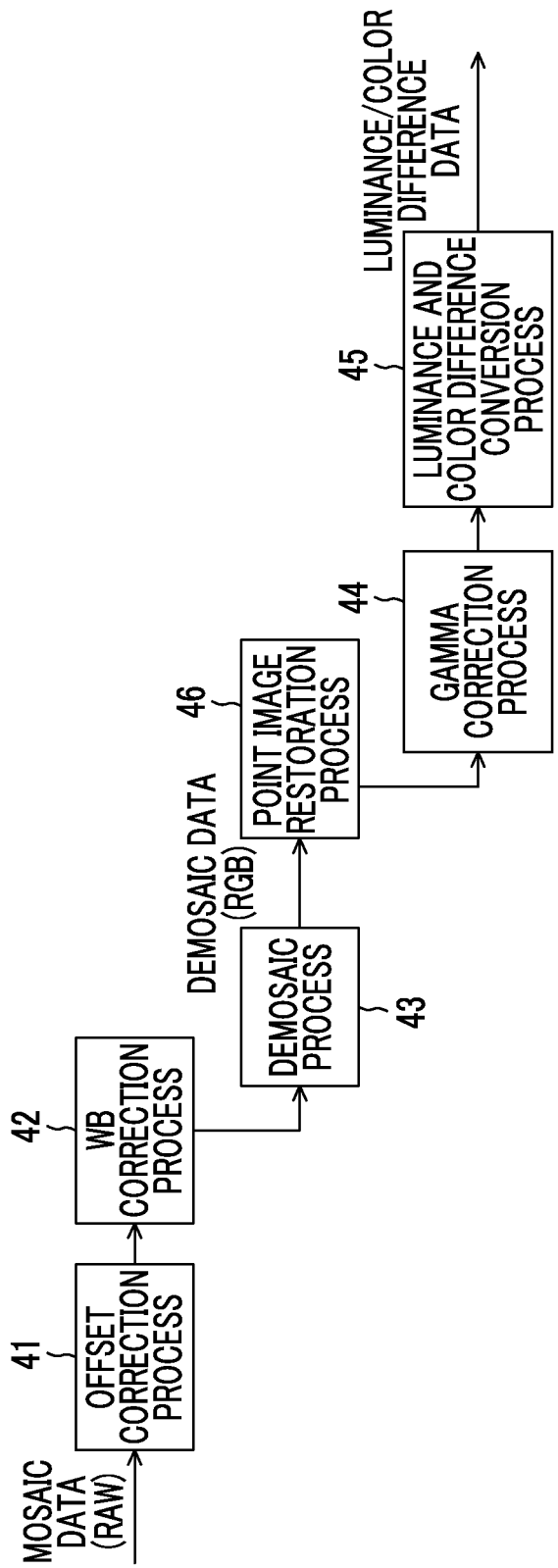
FIG. 9 is a block diagram illustrating the image process flow in the image processing unit, and shows an example where the point image restoration process is performed for RGB color data before the gamma correction process.
Figure 10:
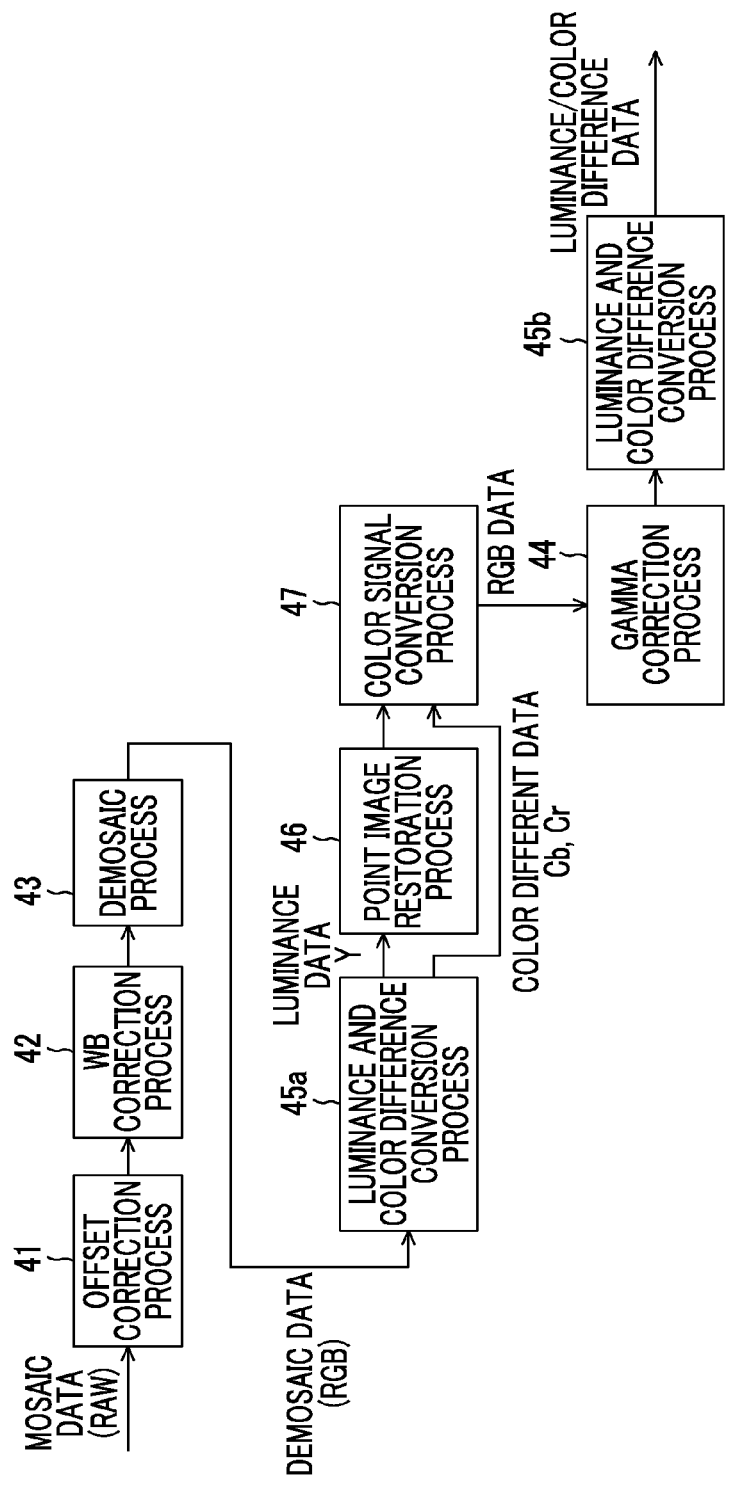
FIG. 10 is a block diagram illustrating the image process flow in the image processing unit, and shows an example where the point image restoration process is performed for luminance data (Y) before the gamma correction process.

FIGS. 7 to 10 are block diagrams illustrating various image process flows in the image processing unit 35 (the camera body controller 28). FIG. 7 shows an example where a luminance data (Y) is subjected to the point image restoration process after the gamma correction process (gradation correction process), and FIG. 8 shows an example where RGB color data is subjected to the point image restoration process after the gamma correction process. FIG. 9 shows an example where RGB color data is subjected to the point image restoration process before the gamma correction process, and FIG. 10 shows an example where luminance data (Y) is subjected to the point image restoration process before the gamma correction process.

In the example of FIG. 7, if mosaic data (RAW image data; source image data) is input, the image processing unit 35 sequentially performs "an offset correction process 41 for adjusting brightness of an image", "a WB correction process 42 for adjusting white balance (WB) of an image", "a demosaic process 43 for acquiring color data of each color of RGB in regard to all pixels through a pixel interpolation process", "a gamma correction process 44 (a gradation correction step; the gamma correction processing unit 33) for performing gradation correction through a logarithmic process to adjust the gradation of pixel data", "a luminance and color difference conversion process 45 for calculating luminance data (Y) and color difference data (Cb/Cr) from RGB color data", and "a point image restoration process (a restoration process step) 46 for subjecting image data (luminance data) to the point image restoration process using the restoration filter based on the point spread function of the optical system used in photographing". Color data corresponds to the color of a color filter in the image capture element 26 which photographs and acquires mosaic data (source image data), and luminance data and color difference data can be calculated from color data using a known calculation expression.

In the example of FIG. 8, the processing order of the luminance and color difference conversion process 45 and the point image restoration process 46 in the image process example of FIG. 7 are replaced. Accordingly, although, in the example of FIG. 7, luminance data of source image data after the gamma correction process (gradation correction) 44 is subjected to the point image restoration process 46, in the example of FIG. 8, RGB color data of source image data subjected to the gamma correction process (gradation correction) 44 is subjected to the point image restoration process 46 by the point image restoration control processing unit 36, and thereafter, luminance data and color difference data are calculated.

In the example of FIG. 9, the processing order of the gamma correction process 44 and the point image restoration process 46 in the image process example of FIG. 8 are replaced. Accordingly, although, in the example shown in FIG. 8, the point image restoration process 46 is performed after the gamma correction process 44, in the example shown in FIG. 9, the point image restoration process 46 is performed before the gamma correction process 44.

In the example of FIG. 10, although the offset correction process 41, the WB correction process 42, and the demosaic process 43 are the same as the examples of FIGS. 7 to 9, a luminance and color difference conversion process 45a is performed after the demosaic process 43, and after luminance data is subjected to the point image restoration process 46, a color signal conversion process 47 for calculating RGB color data from luminance data and color difference data is performed. Then, RGB color data is sequentially subjected to the gamma correction process 44 and a luminance and color difference conversion process 45b, whereby luminance data and color difference data are acquired.

Each of FIGS. 7 to 10 is just an example of the process flow, and other processes may be performed at arbitrary stages as necessary, and a part of the processes shown in FIGS. 7 to 10 may be omitted.

In regard to the difference in the point image restoration process effect among various image process flows, "the gradation correction process (gamma correction process) and the point image restoration process" have the relevance shown in FIG. 11.

FIG. 11 is a diagram showing the correlation of the "gradation correction process (gamma correction process)" and "color data/luminance data" for the point image restoration process.

A column indicated by "antilogarithm (before gradation correction)" of FIG. 11 indicates image characteristics when image data (antilogarithm image data) before the gradation correction process (gamma correction process) is subjected to the image restoration process (see FIGS. 9 and 10). A column indicated by "logarithm (after gradation correction)" of FIG. 11 indicates image characteristics when image data (logarithm image data) after the gradation correction process (gamma correction process) is subjected to the point image restoration process (see FIGS. 7 and 8). A column indicated by "color data (RGB)" of FIG. 11 indicates image characteristics when color data (RGB data) is subjected to the point image restoration process (FIGS. 8 and 9), and a column indicated by "luminance data (Y)" indicates image characteristics when luminance data is subjected to the point image restoration process (see FIGS. 7 and 10).

When comparing antilogarithm image data and logarithm image data, in an ideal system, point image restoration of antilogarithm image data (image data before gradation correction) is more excellent in image restorability than point image restoration of logarithm image data (image data after the logarithmic process including gradation correction) (see "restorability in ideal system of FIG. 11").

The ideal system used herein indicates an ideal system in which conditions for performing an appropriate point image restoration process, such as "the number of taps of the restoration filter for use in the point image restoration process is sufficiently great", "the number of calculation bits is sufficiently great", "the actual blur characteristics of the optical system match optical system blur characteristics data stored in the image processing unit 35", or "input image data (source image data) does not include saturated pixel data in which the pixel value is saturated", are sufficiently satisfied.

In an actual processing system deviated from the ideal system, it is experimentally confirmed that point image restoration of logarithm image data (image data after the logarithmic process including gradation correction) is small in the degree of appearance of a side effect, such as ringing, in the image subjected to the point image restoration (recovered image) compared to point image restoration of antilogarithm image data (image data before gradation correction) (see "luminance system toughness (degree of ringing or the like) in the system deviated from the ideal system" of FIG. 11).

One reason that "the point image restoration process for logarithm image data (image data on a logarithm space)" is small in the degree of appearance of a side effect, such as ringing, compared to "the point image restoration process for antilogarithm image data (image data on an antilogarithm space)" in a real processing system different from the ideal system is that, in pixel data (image data) after the logarithmic process including the gamma correction process, the gradation of a low luminance portion is enhanced and the gradation of a high luminance portion is not enhanced. Furthermore, one reason that image deterioration, such as ringing, is made conspicuous is that overshoot and/or undershoot occurs at the edge (boundary portion) of the image due to the point image restoration process, and overshoot and/or undershoot is enhanced due to gradation correction (see FIG. 6).

If color data (color signal) of each color of RGB is input to the point image restoration control processing unit 36 as assumed, that is, as deterioration information, such as the stored point spread function information of the optical system, "the point image restoration process for color data (RGB data)" can perform effective color data correction. In this case, it is possible to effectively reduce chromatic aberration or the like compared to "the point image restoration process for luminance data (Y data)" (see "restorability in the ideal system" an "color system correction ability" of FIG. 11). However, when the actual behavior of an input signal is not as assumed, in the point image restoration process for color data (RGB data), side effects, such as an increase in the number of places where unnecessary coloring occurs and a conspicuous unnatural tone of color, may occur (see "color system toughness (degree of coloring, degree of blurring, or the like) in a system deviated from the ideal system" of FIG. 11).

In regard to the processing scale (the scale of a processing circuit when a processing system is incorporated into hardware) on software, there is a difference shown in FIG. 11. That is, the point image restoration process of logarithm image data (image data on the logarithm space) has a small processing scale and is advantageous since a calculation process is simple compared to antilogarithm image data (image data on the antilogarithm space). Furthermore, while a processing system for three channels (3ch) is required in the point image restoration process for color data (RGB data), a processing system for one channel (1ch) is sufficient in the point image restoration process for luminance data (Y data); thus, in the point image restoration process for luminance data, the calculation process is simplified and the processing scale can be made compact.

Accordingly, in an actual image processing system, it is preferable to construct an appropriate system according to user's needs in consideration of various characteristics shown in FIG. 11. For example, when the processing conditions are deviated from the ideal processing system, such as "various types are input as an input image signal (image data)", "the processing system is incorporated into hardware on as a small scale as possible", or "there is no guarantee that actual image deterioration information completely matches image deterioration information stored in the processing system", the point image restoration process for logarithm image data is excellent in image toughness (image invulnerability) compared to the point image restoration process for antilogarithm image data. Accordingly, in the actual image processing system, from the viewpoint of improving image toughness, it is preferable to carry out the point image restoration process at the post stage of the gradation correction process (gamma correction process). Furthermore, when focusing on suppression of a side effect of an image process or reduction in the scale of the processing system, an image processing system which carries out the point image restoration process for luminance data rather than color data is preferably applied, and when focusing on color reproducibility, an image processing system which carries out the point image restoration process for color data rather than luminance data is preferably applied.

When performing gradation correction through the logarithmic process including the gamma correction process, a restoration filter itself may have a filter coefficient corresponding to image data before the logarithmic process, or may have a filter coefficient corresponding to image data after the logarithmic process.

When a recovery process (point image restoration process) is performed by applying "a restoration filter having a filter coefficient corresponding to antilogarithm pixel data as a pixel value before gradation correction, that is, before the logarithmic process" to "the pixel value (logarithm pixel data) of image data after the logarithmic process including gradation correction", toughness for image quality deterioration (ringing or the like) occurring in a recovered image (restored image) can be improved, and ringing can be made inconspicuous on the recovered image. This is because, in pixel data (image data) after the logarithmic process, the gradation of the low luminance portion is enhanced and the gradation of the high luminance portion is not enhanced.

Figure 12:
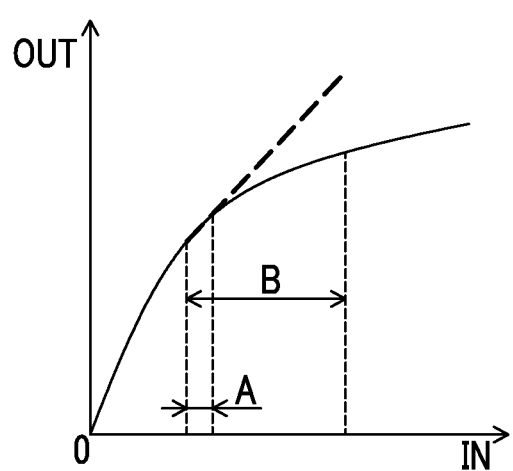
FIG. 12 is a diagram (graph) showing an example of the relationship between pre-process data and post-process data through a logarithmic process including the gamma correction process.

FIG. 12 is a diagram (graph) showing an example of the relationship between pre-process data and post-process data through the logarithmic process including the gamma correction process. The horizontal axis of FIG. 12 indicates pre-process data (gamma correction process input data "IN"), the vertical axis indicates post-process data (gamma correction process output data "OUT"), and a solid line in the graph indicates a gamma correction process gradation curve.

In a general point image restoration process for image data, a region where the effect of the point image restoration process is easily visually recognized is a region with low contrast, and is "a region with a comparatively small level difference of the pixel value" to be approximated linearly in the gamma correction process gradation curve (see "A" of FIG. 12). Meanwhile, in a region with high contrast, that is, in "a region with a comparatively great level difference of the pixel value" constituting a curved portion in the gamma correction process gradation curve, original contrast is high and blur is hardly recognized (see "B" of FIG. 12).

In addition, in a region including a saturated pixel out of the region with high contrast, if the point image restoration process is performed for pixel data (pixel data before gradation correction) whose pixel value is antilogarithm, and then gradation correction (the logarithmic process including the gamma correction process) is performed, undershoot and/or overshoot is enhanced due to the gradation process and ringing is likely to be conspicuous. Meanwhile, when the point image restoration process is performed for pixel data after the logarithmic process, high contrast is compressed through the logarithmic process, and strength of ringing due to the point image restoration process is reduced.

That is, the recovery process (point image restoration process) is performed for pixel data after the logarithmic process using the restoration filter having the filter coefficient corresponding to pixel data whose pixel value is antilogarithm, whereby it is possible to carry out the point image restoration process for the low contrast region, which is generally likely to be visually recognized, with no deterioration, and it is possible to reduce the degree of enhancement of ringing in the high contrast region where ringing is likely to occur due to the point image restoration process.

In particular, when the image processing device (image capture device or the like) can execute a plurality of types of gradation correction (gamma correction process and the like) and stores data of a plurality of types of gamma correction process gradation curves, in the related art (see JP2013-020610A), it is necessary to calculate the limit value of the variation of the pixel signal value for each of a plurality of types of gradation correction. However, according to this system, since the point image restoration process is applied to pixel data after gradation correction, switching of the process according to the type of gradation correction is not required.

Figure 13:
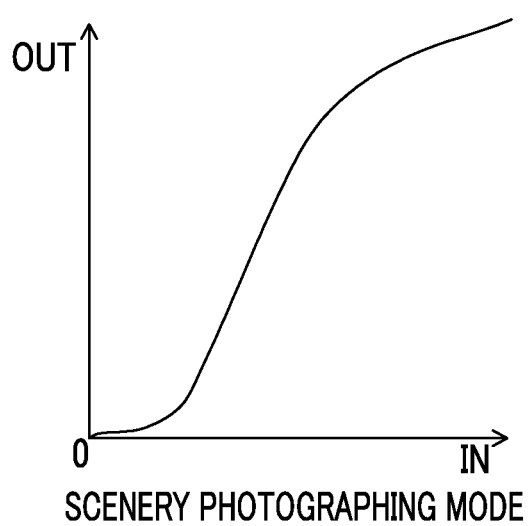
FIG. 13 illustrates the relationship (gamma correction process gradation curve) between an input value (IN) and an output value (OUT) in the gamma correction process as an example of gradation correction, and shows an example of the gamma correction process gradation curve which is used at the time of selecting a scenery photographing mode.
Figure 14:
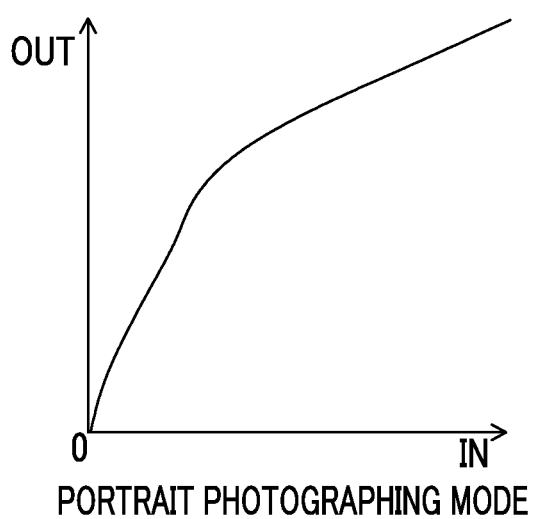
FIG. 14 illustrates the relationship (gamma correction process gradation curve) between an input value (IN) and an output value (OUT) in the gamma correction process as an example of gradation correction, and shows an example of the gamma correction process gradation curve which is used at the time of selecting a portrait photographing mode.

FIGS. 13 and 14 illustrate the relationship (gamma correction process gradation curve) between an input value (IN) and an output value (OUT) in the gamma correction process as gradation correction, FIG. 13 shows an example of the gamma correction process gradation curve which is used at the time of selecting the scenery photographing mode, and FIG. 14 shows an example of the gamma correction process gradation curve which is used at the time of selecting a portrait photographing mode. When a plurality of types of gamma correction process gradation curves for use in the gradation correction process (gamma correction process) are stored, the image capture device, such as the digital camera 10 (see FIG. 1), or the image processing device selects an optimum gamma correction process gradation curve according to the photographing mode from among the stored gamma correction process gradation curves. In this case, when the point image restoration process is performed for image data before gradation correction (gamma correction process), it is necessary to determine the limit value of the point image restoration process for each gradation correction and to switch the point image restoration process according to the type of the gamma correction process (for example, see JP2013-020610A). However, when the point image restoration process is performed for pixel data after the gamma correction process, it is not necessary to switch the point image restoration process according to the type of the gamma correction process. Accordingly, in "a case where the point image restoration process is performed for pixel data after the gamma correction process" without requiring switching of the process, when the restoration filter is created in advance, it is possible to suppress memory consumption, and when the restoration filter is calculated successively for each process, it is possible to facilitate the process and to suppress the calculation time.

In general, the point spread function (PSF) is based on the assumption that the input is linear, and a restoration filter based on the assumption is easily generated using a "linear coefficient", that is, "a filter coefficient corresponding to antilogarithm pixel data".

The restoration filter has a filter coefficient corresponding to the pixel value before the gamma correction process (gradation correction process), whereby it is possible to reduce a memory, a processing time, a development or design load, and the like, and it is very effective and useful for practical use.

Meanwhile, the recovery process (point image restoration process) is performed for the pixel value (logarithm pixel data) after the logarithmic process including gradation correction using the restoration filter having the filter coefficient corresponding to the pixel value (logarithm pixel data) after the logarithmic process, whereby it is possible to improve toughness with respect to image quality deterioration due to ringing caused by the point image restoration process, and to make caused ringing inconspicuous on the image.

That is, when pixel data has the pixel value (logarithm pixel data) after the logarithmic process including gradation correction, the point image restoration process is performed using the restoration filter having the filter coefficient corresponding to the pixel value (logarithm pixel data) after the logarithmic process, whereby it is possible to accurately perform the point image restoration process itself. In this case, target image data of the point image restoration process is set to "source image data after gradation correction", high contrast is compressed through the logarithmic process including gradation correction, and it is possible to reduce strength of ringing caused by the point image restoration process.

The restoration filter for use in the point image restoration process may be generated in advance, or may be successively calculated and generated according to the execution of the point image restoration process. From the viewpoint of reducing the calculation amount at the time of the point image restoration process, it is preferable that the restoration filter is generated in advance. Furthermore, from the viewpoint of using the restoration filter excellent in adaptability, it is preferable that the restoration filter is successively calculated at the time of the point image restoration process.

When the restoration filter is generated in advance, the filter coefficient of the restoration filter may be determined by performing calculation based on the pixel value determined through the logarithmic process including the gamma correction process for the input pixel value (input image data). The pixel value which is used for generating the restoration filter may be a luminance value or a pixel value (for example, the pixel value of G) relating to one channel representatively selected among RGB color data. Furthermore, the pixel value which is used for generating the restoration filter may be a pixel value of a main object, or may be a pixel value which is determined from the average value of the entire image.

The point image restoration process may be a process for restoring only an amplitude component of source image data to obtain recovered image data, or may be a process for restoring an amplitude component and a phase component of source image data to obtain recovered image data. That is, it is possible to calculate a restoration filter based on at least one of a modulation transfer function (MTF)/a phase transfer function (PTF) of an optical system. The blur characteristics of the optical system can be expressed by a so-called optical transfer function (OTF), and a function which is obtained by subjecting the OTF to inverse Fourier transform is called a point spread function (PSF). The MTF is an absolute value component of the OTF, and the PTF represents a phase shift as a function of a spatial frequency. Accordingly, the restoration filter which is used for the point image restoration process can be appropriately designed based on the OTF (MTF/PTF) or the PSF of the optical system.

<Point Image Restoration Process for High Luminance Scene Image>

The inventors have conducted intensive studies focusing on the effect of the point image restoration process influenced by the distribution (expressed by a dynamic range, a histogram, or the like) of brightness of a photographic scene in addition to the knowledge described above, and have found new knowledge about the correlation between "the brightness distribution of the photographic scene" and "image quality deterioration caused by the point image restoration process".

That is, in regard to data on the high luminance side (highlight side) among image data after the gamma correction process, the deviation of matching between "the point spread function (PSF or the like) of the optical system" and "image data" becomes great, and image quality deterioration, such as overcorrection, due to the point image restoration process is likely caused. In particular, in the point image restoration process which uses the restoration filter having the filter coefficient corresponding to antilogarithm pixel data, matching deviation tends to be greater, and as a result, image quality degradation of image data (restored image data, recovered image data) may be caused by the point image restoration process. That is, when image data inclines toward the high luminance side to be bright as a whole by the influence of the photographic scene, the proportion of a high luminance region in the entire image comparatively increases, and an image region where the deviation of matching with the point spread function of the optical system is great increases. Accordingly, in the point image restoration process for image data inclining toward the high luminance side, a region where overcorrection or the like occurs increases comparatively and image degradation is likely conspicuous in an entire image.

In this way, image data of a scene inclining toward the high luminance side as a whole after the gamma correction process has a great pixel ratio on the high luminance side on which the deviation of matching with the point spread function is great. If the point image restoration process using "the restoration filter corresponding to antilogarithm (image data before the gamma correction process)" where the deviation of matching with the point spread function is great is applied to such image data, image quality deterioration due to the point image restoration process is likely to be more conspicuous. In addition, since such image data has a small pixel ratio on the low luminance side, beneficial effects of "the point image restoration process using the restoration filter corresponding to image data before the gamma correction process for image data after the gamma correction process" may be weakened. That is, an effect of "enabling a high-accuracy point image restoration process with the pixels on the low luminance side while reducing the occurrence of ringing due to the saturated pixel by applying the point image restoration process using the restoration filter corresponding to antilogarithm to image data after the gamma correction process with respect to image data of a wide dynamic range" may be weakened.

The inventors have devised, based on new knowledge described above, a new technique for enabling the restoration process based on the point spread function with excellent accuracy while suppressing "image quality deterioration due to brightness of the object image" or "image quality deterioration due to the photographing conditions responsible for brightness of the photographic image".

Hereinafter, a preferred embodiment of the invention is illustrated.

<First Embodiment>

In this embodiment, a case where the point image restoration process is performed by applying the restoration filter having the filter coefficient corresponding to image data before the gamma correction process to source image data subjected to gradation correction through the logarithmic process including the gamma correction process will be described. Accordingly, the restoration filter has the filter coefficient corresponding to antilogarithm, and the point image restoration process is performed by applying the restoration filter based on antilogarithm to source image data after the gamma correction process.

As described above, since the deviation of matching between "the characteristics of the restoration filter based on the point spread function of the optical system" and "image quality deterioration of image data after the gamma correction process" on the high luminance side of image data is great, the point image restoration process for image data after the gamma correction process (primarily, the point image restoration process using the restoration filter corresponding to antilogarithm) may cause image degradation due to overcorrection or the like.

In order to reduce image quality deterioration of image data on the high luminance side, the point image restoration control processing unit 36 of this embodiment controls the restoration intensity of the point image restoration process for photographic image data based on the distribution of brightness of a photographic scene expressed by a dynamic range, a histogram, or the like. That is, the point image restoration control processing unit 36 adjusts the restoration intensity of the point image restoration process according to the distribution characteristics of brightness of photographic image data, and performs control for weakening the restoration intensity or the like when the proportion of the region (high luminance region) having brightness likely to cause overcorrection or the like to occur due to the point image restoration process increases. For example, if it is determined that the photographic scene inclines toward the high luminance side, the restoration intensity is lowered compared to a case where the photographic scene does not incline toward the high luminance side, or the restoration process (blur image correction process) is performed while switching to a restoration filter (base filter, filter coefficient) which hardly causes image quality deterioration, such as ringing, or the restoration process itself is stopped (skipped).

The point image restoration control processing unit 36 (in particular, a restoration processing unit 39 described below) may perform the restoration process by applying the restoration filter to a "luminance component" of source image data (image data after the gamma correction process) subjected to gradation correction, or may perform the restoration process by applying the restoration filter to a "color component" of source image data subjected to gradation correction.

The "luminance component" used herein is an element which can directly or indirectly represent brightness of an image, and is not particularly limited. For example, a "luminance signal (Y) component" when image data is represented by a luminance signal (Y) and a color difference signal, or a "lightness dimension (L*) component" when image data is represented by a lightness dimension (L*) and a color-opponent dimension can be included in the "luminance component" used herein. Furthermore, a color component which can become an indirect index of brightness of an image may be handled as a "luminance component", or a color component contributing most to brightness of an image among the color components of image data can be set as a "luminance component". Accordingly, for example, G color data among RGB color data may be set as a "luminance component". Similarly, the "color component" used herein is an element which can directly or indirectly represent a color of an image, and is not particularly limited. Accordingly, for example, each of color components (for example, RGB or the like) corresponding to the color filter of the image capture element 26 may be set as a "color component" used herein.

In the following embodiment, for convenience of description, although a case where the point image restoration process is performed for a "luminance component" of source image data will be described (see FIG. 7), the same point image restoration process can be performed even in a case where the point image restoration process is performed for a "color component" of source image data (see FIG. 8). Hereinafter, a specific example of restoration process control will be described.

Figure 15:
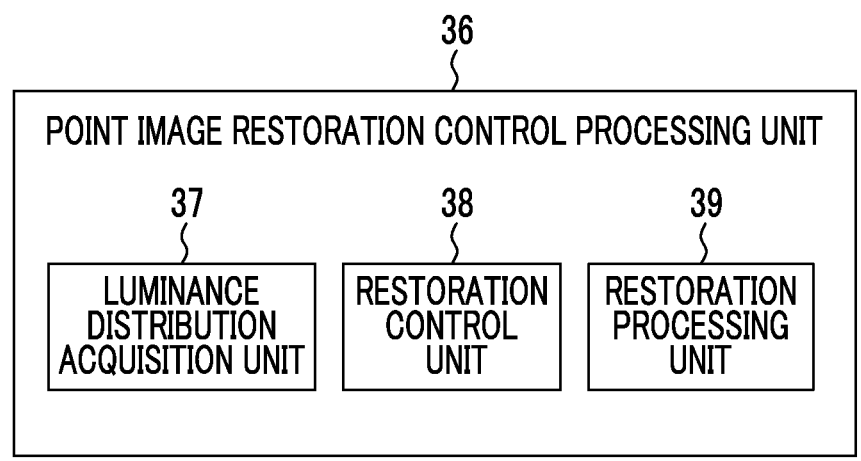
FIG. 15 is a functional block diagram showing an example of a point image restoration control processing unit according to a first embodiment.

FIG. 15 is a functional block diagram showing an example of the point image restoration control processing unit 36 of the first embodiment. Various image processing blocks shown in FIG. 15 and other drawings may not necessarily be provided separately, and a plurality of image processing blocks may be realized by integrally configured hardware and/or software.

The point image restoration control processing unit 36 of this example includes a luminance distribution acquisition unit 37 which acquires the luminance distribution of the source image data, a restoration processing unit 39 which performs the restoration process, and a restoration control unit 38 which performs control such that the restoration processing unit 39 controls the restoration process.

In this example, source image data is subjected to gradation correction through the logarithmic process including the gamma correction process by another unit (see the "gamma correction processing unit 33 (gradation correction unit)" of FIG. 2) of the image processing unit 35, and source image data after the gamma correction process is input to the point image restoration control processing unit 36. Source image data after the gamma correction process input to the point image restoration control processing unit 36 is analyzed in the luminance distribution acquisition unit 37 and information (luminance distribution information) relating to the luminance distribution is acquired. The luminance distribution information acquired by the luminance distribution acquisition unit 37 is sent to the restoration control unit 38, and the restoration control unit 38 performs control such that the restoration processing unit 39 subjects source image data to an appropriate point image restoration process based on the luminance distribution information.

In particular, in this example, the point image restoration process is controlled based on the proportion of the high luminance region (highlight region) in the entire source image data, and the restoration control unit 38 controls the restoration processing unit 39 based on a characteristic of a luminance value equal to or greater than a threshold value (first threshold value) in the luminance distribution of source image data. The details of the restoration process control based on the proportion of the high luminance region will be described below.

Figure 16:
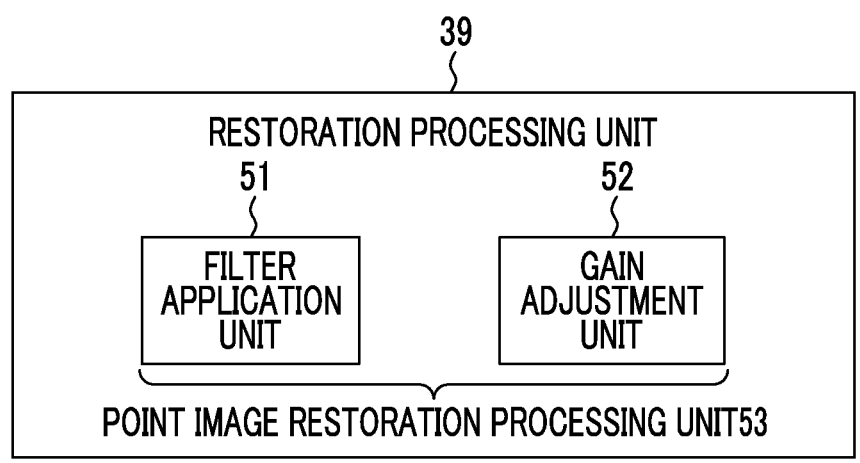
FIG. 16 is a functional block diagram showing an example of a restoration processing unit.

FIG. 16 is a functional block diagram showing an example of the restoration processing unit 39. The restoration processing unit 39 of this example has a filter application unit 51 and a gain adjustment unit 52 constituting a point image restoration processing unit 53, and the respective units constituting the point image restoration processing unit 53 cooperate to perform the point image restoration process.

The filter application unit 51 applies the restoration filter to source image data to acquire restored image data. The gain adjustment unit 52 adjusts the amplification factor of the difference between source image data and restored image data to a difference value after amplification factor adjustment, and acquires recovered image data from the difference value after amplification factor adjustment and source image data.

Figure 17:
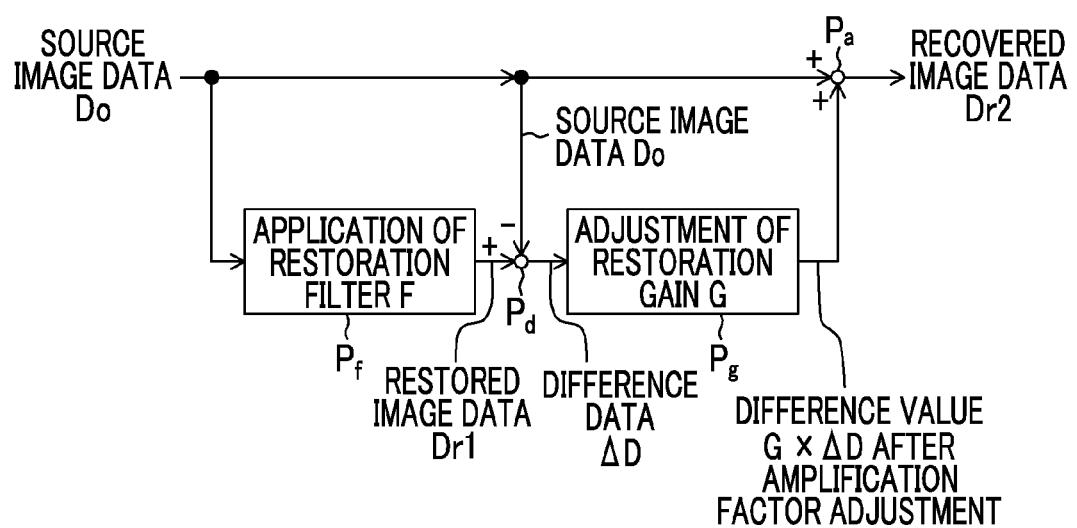
FIG. 17 is a control circuit diagram showing an example of the point image restoration process (filter application process and gain adjustment process) which is performed by a filter application unit and a gain adjustment unit.

FIG. 17 is a control circuit diagram showing an example of the point image restoration process (filter application process and gain adjustment process) which is performed by the filter application unit 51 and the gain adjustment unit 52.

First, in the filter application unit 51, the restoration filter F is applied to source image data Do (filter application process $P_f$), and restored image data Dr1 is calculated. The restoration filter F which is applied to the source image data Do is not particularly limited as long as the restoration filter F is based on the point spread function (PSF, OTF, MTF, PTF, or the like) of the optical system (the lens 16, the diaphragm 17, or the like), and may be an actual space filter or a frequency space filter (see FIG. 4).

Thereafter, in the gain adjustment unit 52, the difference of image data before and after the filter application process is calculated (difference derivation process $P_d$), and the adjustment of the amplification factor (restoration gain) to the difference is performed (gain adjustment process $P_g$). That is, as shown in FIG. 17, in the difference derivation process $P_d$, the difference data ΔD (ΔD=Dr1−Do) between restored image data Dr1 passing through the filter application process $P_f$ and source image data Do is calculated. In the gain adjustment process $P_g$, the adjustment of the amplification factor (restoration gain) G to difference data ΔD is performed to calculate the difference value (G×ΔD) after amplification factor adjustment, and an addition process $P_a$ of the difference value (G×ΔD) after amplification factor adjustment and source image data Do is performed to calculate recovered image data Dr2(Dr2=Do+G×ΔD). As the point image restoration process, another method similar to the above-described method may be used, and for example, the following process may be performed. The restoration filter F is applied to source image data Do (filter application process $P_f$), and restored image data Dr1 is calculated. Thereafter, as the gain adjustment process $P_g$, the adjustment of the amplification factor (restoration gain) G to restored image data Dr1 may be performed (Dr1×G), and the addition process $P_a$ of this value and a value obtained by multiplying source image data Do by (1−G) may be performed to calculate recovered image data Dr2.

In this way, the restoration intensity of the point image restoration process fluctuates according to the restoration filter (filter coefficient) F in the filter application process $P_f$ and the amplification factor (restoration gain) G in the gain adjustment process $P_g$. For this reason, the adjustment of the restoration intensity of the point image restoration process can be executed by "switching the restoration filter (filter coefficient) for use in the filter application process $P_f$" and/or "changing the amplification factor (restoration gain) G in the gain adjustment process $P_g$".

For example, a process for "lowering the restoration intensity of the point image restoration process" can include "a filter application process $P_f$ using another restoration filter with which restored image data Dr1 having a small difference from source image data is obtained compared to a case where a normal restoration filter is used (the degree of restoration is weak), that is, a different filter coefficient" and "the gain adjustment process $P_g$ using another amplification factor with which the difference value (G×ΔD) after amplification factor adjustment is small (the degree of amplification is weak) compared to a case where a normal amplification factor (restoration gain) G is used". The restoration control unit 38 performs control such that the restoration processing unit 39 (the filter application unit 51 and the gain adjustment unit 52) performs at least one of these processes (filter switching process and amplification factor change process), thereby lowering the restoration intensity of the point image restoration process.

Figure 18:
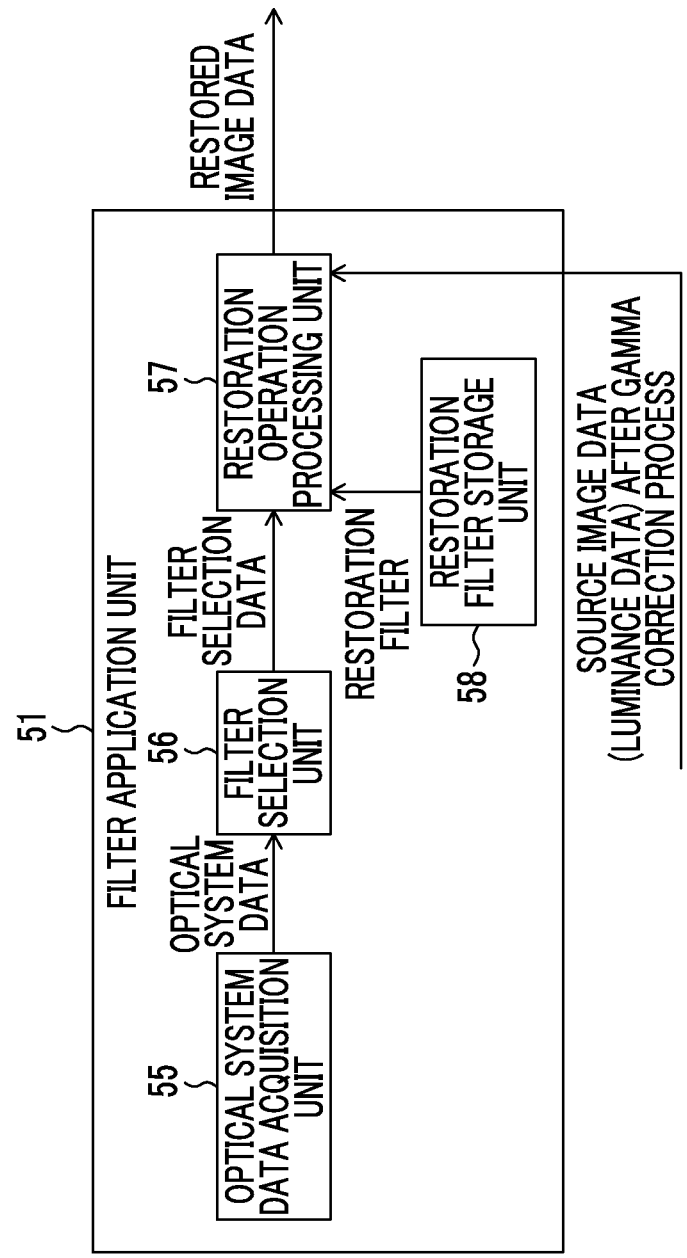
FIG. 18 is a functional block diagram showing an example of the filter application unit.

FIG. 18 is a functional block diagram showing an example of the filter application unit 51. The filter application unit 51 of this example has an optical system data acquisition unit 55, a filter selection unit 56, a restoration operation processing unit 57, and a restoration filter storage unit 58.

The optical system data acquisition unit 55 acquires optical system data indicating the point spread function of the optical system (the lens 16, the diaphragm 17, or the like). Optical system data is data which becomes a selection criterion of the restoration filter in the filter selection unit 56, and may be information directly or indirectly indicating the point spread function of the optical system used at the time of photographing and acquiring source image data to be processed. Accordingly, for example, the point spread function (PSF, OTF (MTF, PTF)) itself of the optical system may be used as optical system data, and the type of the optical system indirectly indicating the point spread function of the optical system, for example, the model number of the lens unit 12 (the lens 16) or the like used at the time of photographing may be used as optical system data.

The filter selection unit 56 selects a restoration filter corresponding to optical system data of the optical system used for photographing and acquiring source image data among the restoration filters stored in the restoration filter storage unit 58 based on optical system data acquired by the optical system data acquisition unit 55. Information of the restoration filter selected by the filter selection unit 56 is sent to the restoration operation processing unit 57 as filter selection data.

The filter selection unit 56 recognizes type information (restoration filter storage information) of the restoration filters stored in the restoration filter storage unit 58, and a method of recognizing the restoration filter storage information of the filter selection unit 56 is not particularly limited. For example, the filter selection unit 56 may have a storage unit (not shown) which stores the restoration filter storage information, and when the type information of the restoration filter stored in the restoration filter storage unit 58 is changed, the restoration filter storage information stored in the storage unit of the filter selection unit 56 may be changed. Furthermore, the filter selection unit 56 may be connected to the restoration filter storage unit 58 to directly recognize "information of the restoration filters stored in the restoration filter storage unit 58", or may recognize the restoration filter storage information from other processing units (memory or the like) which recognize the restoration filter storage information.

The filter selection unit 56 may select a restoration filter corresponding to the point spread function of the optical system used for photographing and acquiring source image data, and the selection method thereof is not particularly limited. For example, when optical system data from the optical system data acquisition unit 55 directly indicates the point spread function, the filter selection unit 56 selects a restoration filter corresponding to the point spread function indicated by optical system data. Furthermore, when optical system data from the optical system data acquisition unit 55 indirectly indicates the point spread function, the filter selection unit 56 selects a restoration filter corresponding to the point spread function of the optical system used for photographing and acquiring source image data to be processed from "optical system data indirectly indicating the point spread function".

The restoration operation processing unit 57 receives luminance data and filter selection data as source image data after the gamma correction process as input. The restoration operation processing unit 57 reads a restoration filter having a filter coefficient corresponding to optical system data of the optical system used for acquiring source image data from the restoration filter storage unit 58 based on filter selection data. Then, the restoration operation processing unit 57 performs the point image restoration process using the restoration filter selected and read based on optical system data and calculates and acquires restored image data from source image data.

The restoration filter storage unit 58 stores restoration filters generated in advance, and the restoration filters stored in the restoration filter storage unit 58 are appropriately read by the restoration operation processing unit 57. The type information of the restoration filters stored in the restoration filter storage unit 58 is acquired by the filter selection unit 56, and the selection of the restoration filter in the filter selection unit 56 is performed from among the restoration filters stored in the restoration filter storage unit 58. The restoration filters stored in the restoration filter storage unit 58 of this example have filter coefficients corresponding to image data (antilogarithm image data) before the gamma correction process.

In this way, according to the filter application unit 51 shown in FIG. 18, a plurality of types of restoration filters are generated in advance and stored in the restoration filter storage unit 58, and an optimum restoration filter is selected based on optical system data and used for the point image restoration process. The restoration filters for use in the point image restoration process may be successively calculated at the time of the point image restoration process.

Figure 19:
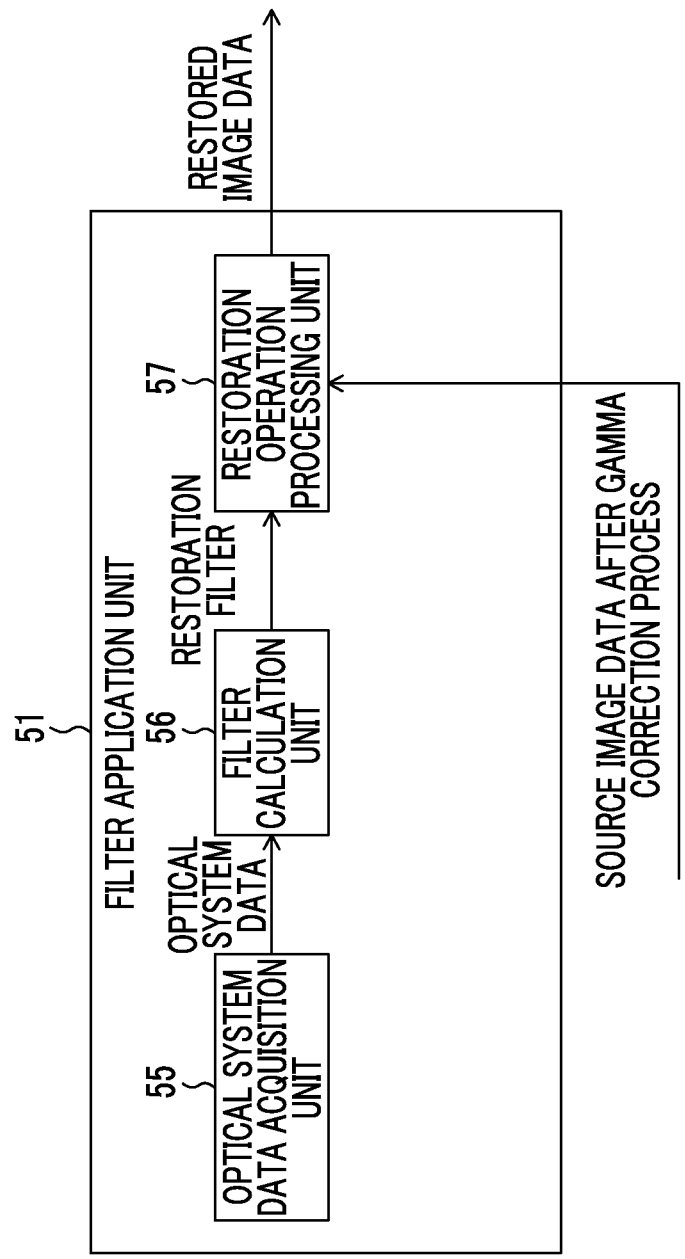
FIG. 19 is a functional block diagram showing another example of the filter application unit.

FIG. 19 is a functional block diagram showing another example of the filter application unit 51. The filter application unit 51 of this example successively generates the restoration filters based on optical system data of the optical system used for acquiring source image data and performs the point image restoration process using the generated restoration filters.

That is, the filter application unit 51 of this example has a filter calculation unit 59 instead of the filter selection unit 56 (see FIG. 18), and does not include the restoration filter storage unit 58.

The filter calculation unit 59 of this example acquires the point spread function of the optical system used for photographing and acquiring source image data to be processed based on optical system data from the optical system data acquisition unit 55, and calculates a restoration filter corresponding to the acquired point spread function. The restoration filter calculated by the filter calculation unit 59 is sent to the restoration operation processing unit 57 and is used for the point image restoration process of source image data in the restoration operation processing unit 57.

The calculation method of the restoration filter in the filter calculation unit 59 is not particularly limited. For example, "the point spread function of the optical system used for photographing and acquiring source image data to be processed" itself may be sent from the optical system data acquisition unit 55 to the filter calculation unit 59 as optical system data, and the filter calculation unit 59 may calculate and generate a restoration filter from optical system data using an arbitrary method. Furthermore, when a storage unit (not shown) which stores data of the point spread function of the optical system for each type of the optical system is provided, the filter calculation unit 59 may send optical system data indicating "the type of the optical system used for photographing and acquiring source image data to be processed" from the optical system data acquisition unit 55 to the filter calculation unit 59, and the filter calculation unit 59 may determine the type of the optical system from optical system data, may read data of the point spread function of the optical system of the determined type from the storage unit (not shown), and may calculate and generate a restoration filter from the read data of the point spread function.

Accordingly, in a case where the restoration intensity of the point image restoration process is adjusted by switching the restoration filter, the restoration control unit 38 controls the restoration processing unit 39 such that a restoration filter different from the restoration filter corresponding to optical system data indicating the characteristics of the optical system is selected (see the "filter selection unit 56" of FIG. 18) or is calculated (see the "filter calculation unit 59" of FIG. 19).

Next, a control example of the restoration process of this embodiment will be described.

Figure 20:
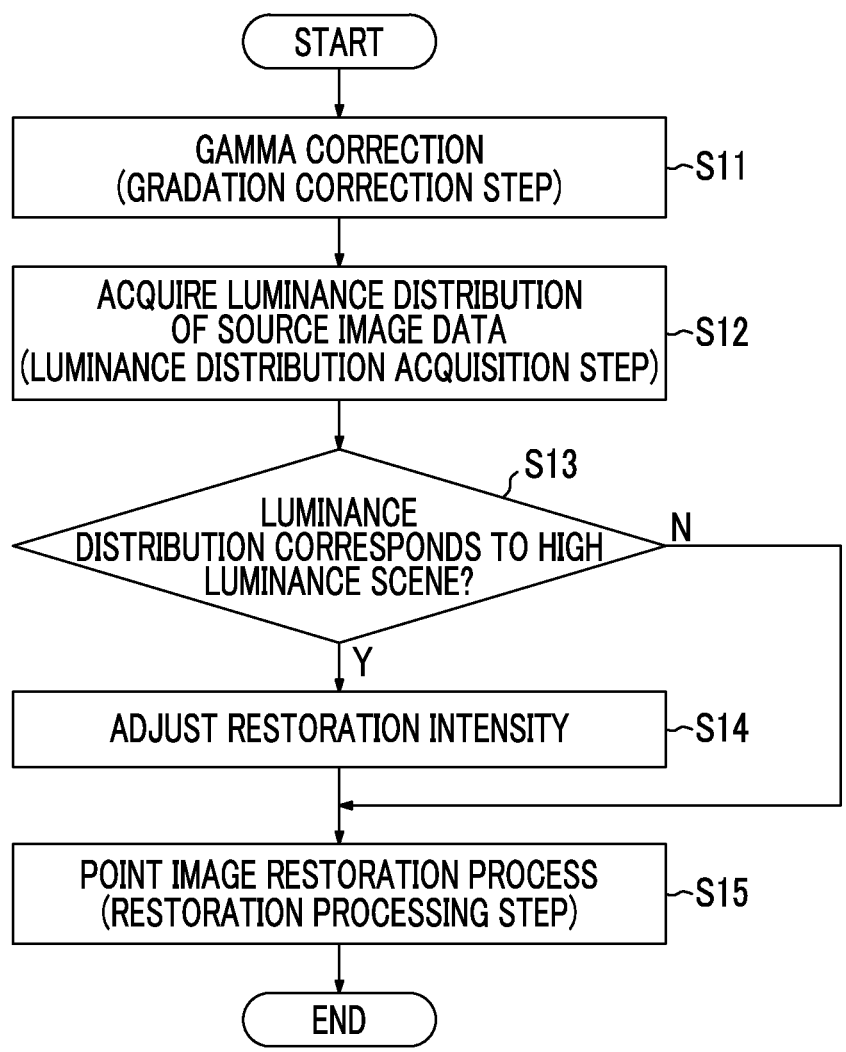
FIG. 20 is a flowchart showing the flow of an image process including a point image restoration process according to the first embodiment.

FIG. 20 is a flowchart showing the flow of an image process including the point image restoration process of the first embodiment. In this example, prior to the point image restoration process, the gamma correction process is performed for source image data in the image processing unit 35 (gamma correction processing unit 33) (S11 of FIG. 20: gradation correction step). Source image data after the gamma correction process is input to the point image restoration control processing unit 36, and the luminance distribution of source image data after the gamma correction process is acquired by the luminance distribution acquisition unit 37 (S12: luminance distribution acquisition step).

The restoration control unit 38 determines whether or not source image data after the gamma correction process satisfies a luminance state (first luminance state) of a high luminance scene (highlight scene) based on the luminance distribution of source image data acquired by the luminance distribution acquisition unit 37 (S13).

"The luminance state of the high luminance scene" is a state in which the luminance state of image data inclines toward the high luminance side, and refers to a state in which image quality deterioration, that is, overcorrection or the like is likely to occur or is likely conspicuous when the point image restoration process is performed. Accordingly, the determination method of the high luminance scene can be defined from various viewpoints. The details of "the determination method of the high luminance scene" will be described below.

When source image data satisfies the luminance state of the high luminance scene (Y of S13), the restoration control unit 38 controls the restoration processing unit 39, the restoration intensity of the point image restoration process is adjusted (S14), and the point image restoration process based on the restoration intensity after adjustment is performed by the restoration processing unit 39 (S15). Specifically, when source image data is in the luminance state of the high luminance scene, the restoration control unit 38 performs control such that the restoration processing unit 39 lowers the restoration intensity of the point image restoration process compared to a case where source image data does not satisfy the luminance state of the high luminance scene. FIG. 20 shows an example where the restoration intensity of the point image restoration process is lowered when source image data is in the luminance state of the high luminance scene; however, when source image data is in the luminance state of the high luminance scene, the restoration control unit 38 may perform control such that the restoration processing unit 39 does not subject source image data to the point image restoration process.

The adjustment of the restoration intensity of the point image restoration process can be performed by switching the restoration filter, that is, by changing the filter coefficient, by changing the restoration gain (amplification factor) of the difference of image data before and after the point image restoration process, or by both of them (see FIG. 17). Accordingly, when source image data satisfies the luminance state of the high luminance scene, the restoration control unit 38 may perform control such that the restoration processing unit 39 (filter application unit 51) adjusts the filter coefficient of the restoration filter to lower the restoration intensity of the point image restoration process compared to a case where source image data does not satisfy the luminance state of the high luminance scene. Furthermore, when source image data satisfies the luminance state of the high luminance scene, the restoration control unit 38 may perform control such that the restoration processing unit 39 (gain adjustment unit 52) adjusts the amplification factor (restoration gain) to lower the restoration intensity of the restoration process compared to a case where source image data does not satisfy the luminance state of the high luminance scene.

A method of disabling the point image restoration process for the source image data is not particularly limited. For example, source image data may be sent to the post stage while substantially skipping the filter application unit 51 and the gain adjustment unit 52, or a point image restoration process using a restoration filter and a restoration gain (amplification factor) such that image data (source image data and recovered image data) before and after the point image restoration process is not changed may be performed by the filter application unit 51 and the gain adjustment unit 52.

When source image data is not in the luminance state of the high luminance scene (N of S13), the restoration control unit 38 controls the restoration processing unit 39, the adjustment of the restoration intensity of the point image restoration process is not performed, and a point image restoration process based on normal restoration intensity is performed by the restoration processing unit 39 (S15). That is, a point image restoration process using a restoration filter and a restoration gain (amplification factor) corresponding to optical system data indicating the characteristics of the optical system is performed in the restoration processing unit 39 (filter application unit 51 and gain adjustment unit 52).

<High Luminance Scene>

Next, the relationship between luminance of image data and image quality deterioration (overcorrection or the like) due to the point image restoration process will be described.

Figure 21:
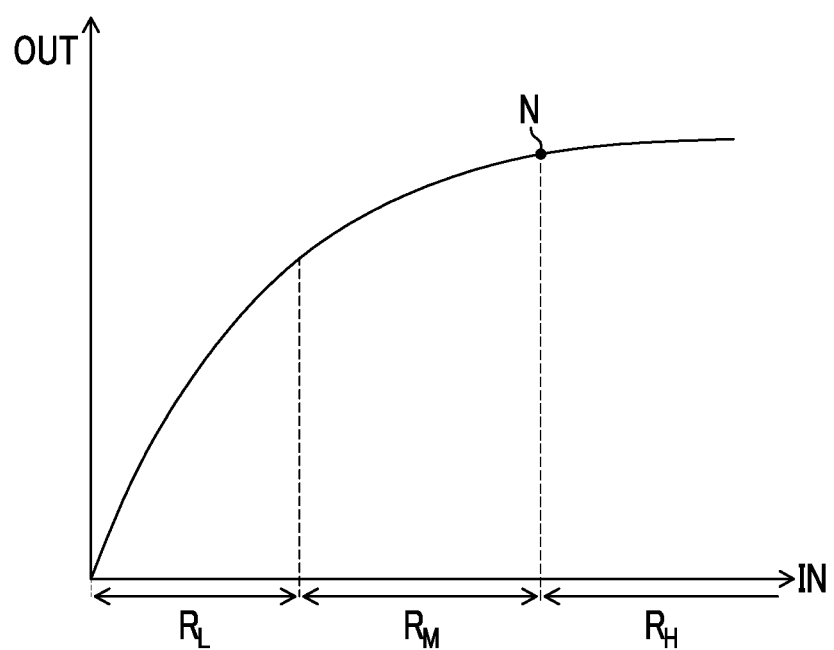
FIG. 21 is a diagram (graph) showing an example of the relationship between pre-process data and post-process data through the logarithmic process including the gamma correction process, and is, in particular, a diagram illustrating a region where image quality deterioration due to overcorrection or the like is likely to occur.

FIG. 21 is a diagram (graph) showing an example of the relationship between pre-process data and post-process data through the gamma correction process (logarithmic process), and in particular, is a diagram illustrating a region where image quality deterioration due to overcorrection or the like is likely to occur. The horizontal axis of FIG. 21 indicates data before the gamma correction process (gamma correction process input data "IN"), and the vertical axis indicates data after the gamma correction process (gamma correction process output data "OUT"). Reference numeral "$R_L$" of FIG. 21 indicates a low luminance region, reference numeral "$R_M$" indicates an intermediate luminance region, and reference numeral "$R_H$" indicates a high luminance region (highlight region). A gamma correction process gradation curve indicated by a solid line in the graph of FIG. 21 is just an example, and the distinction of the low luminance region $R_L$, the intermediate luminance region $R_M$, and the high luminance region $R_H$ indicates just a relative relationship, and a specific position of each region should not be interpreted uniquely.

A region where image quality deterioration due to overcorrection or the like is likely to occur due to the point image restoration process exists in the high luminance region $R_H$ rather than the low luminance region $R_L$ and the intermediate luminance region $R_M$ in consideration of the gamma correction process characteristics. For example, in the high luminance region $R_H$ where a luminance signal (Y) component when image data is represented by a luminance signal (Y)/a color difference signal (CrCb) has a value equal to or greater than 80% with respect to the highest luminance value, image quality deterioration due to the point image restoration process is likely conspicuous. However, in an actual gamma correction process, since a unique gamma correction process gradation curve is applied to each luminance region (low luminance region, intermediate luminance region, high luminance region, and the like), a range in which image quality deterioration due to the point image restoration process is conspicuous may fluctuate according to the gamma correction process characteristics. For example, it is possible to perform a gamma correction process based on a gamma correction process gradation curve which "improves appearance of noise by suppressing the gain amount of the gamma correction process in the low luminance region, enhances a modulation feeling by increasing the gain amount of the gamma correction process in the intermediate luminance region, and moderates a change in gradation by suppressing the gain amount of the gamma correction process in the high luminance region". When the gamma correction process based on the gamma correction process gradation curve is performed, it may be determined that image quality deterioration (overcorrection or the like) due to the point image restoration process is likely more conspicuous in a region on the high luminance side than a point (knee point: see reference numeral "N" of FIG. 21) where the gain amount of the gamma correction process is suppressed in order to moderate a change in gradation in the high luminance region.

<Restoration Process Control Based on Proportion of High Luminance Region>

Figure 22:
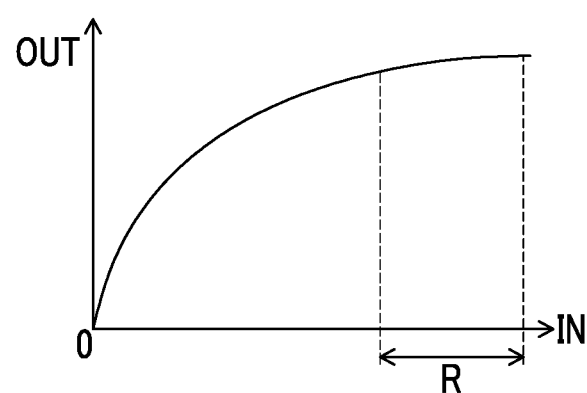
FIG. 22 shows an example of the relationship between pre-process data and post-process data through the logarithmic process including the gamma correction process.
Figure 23:
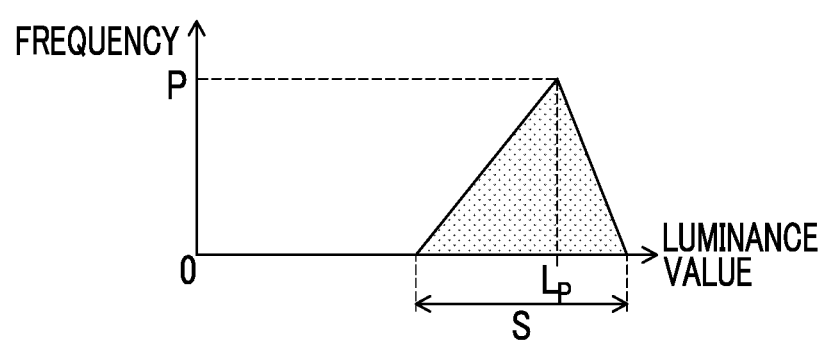
FIG. 23 is a diagram showing a luminance distribution example in image data.
Figure 24:
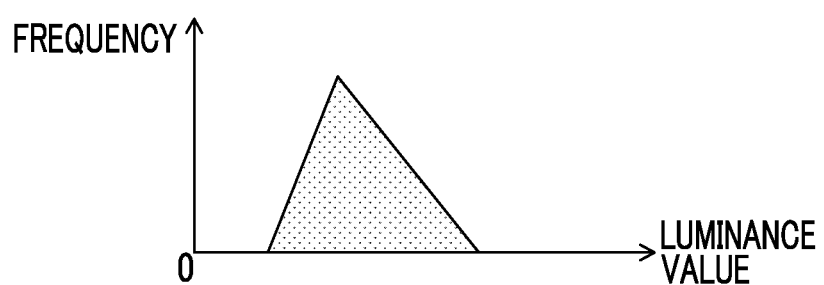
FIG. 24 is a diagram showing a luminance distribution example in image data.

FIGS. 22 to 24 are diagrams showing a luminance region where image quality deterioration (overcorrection or the like) due to the point image restoration process is likely to occur and the luminance distribution of image data. FIG. 22 is a diagram (graph) showing an example of the relationship between pre-process data and post-process data through the logarithmic process including the gamma correction process, the horizontal axis thereof indicates data before the gamma correction process (gamma correction process input data "IN"), and the vertical axis thereof indicates data after the gamma correction process (gamma correction process output data "OUT"). FIGS. 23 and 24 respectively show a luminance distribution example of source image data, FIG. 23 shows a luminance distribution example where image quality deterioration (overcorrection or the like) due to the point image restoration process is likely to occur, and FIG. 24 shows a luminance distribution example where image quality deterioration (overcorrection or the like) due to the point image restoration process hardly occurs. In FIGS. 23 and 24, the horizontal axis indicates a luminance value, indicates a great luminance value (high luminance) toward the right side on the paper surface, and indicates a small luminance value (low luminance) toward the left side. In FIGS. 23 and 24, the vertical axis indicates frequency, indicates a high appearance frequency of a corresponding luminance value in source image data toward the upper side on the paper surface, and indicates a low appearance frequency of a corresponding luminance value toward the lower side.

As described above, in the high luminance region indicated by reference numeral "R" of FIG. 22, image quality deterioration (overcorrection or the like) due to the point image restoration process is likely to occur. Accordingly, as shown in FIG. 23, when the luminance distribution of source image data inclines toward the high luminance region, image quality deterioration (overcorrection or the like) due to the point image restoration process is likely conspicuous. For this reason, for example, even if it is determined by a spot type automatic exposure (AE) mechanism (a face recognition type automatic exposure mechanism (face AE) or the like) that a specific region of an image does not incline toward the high luminance side, when source image data has a luminance distribution inclining toward the high luminance side as the entire image, image quality deterioration (overcorrection or the like) due to the point image restoration process is likely conspicuous. However, according to this embodiment, even in image data in which image quality deterioration (overcorrection or the like) due to the point image restoration process is likely conspicuous, the restoration intensity of the point image restoration process is lowered or the point image restoration process is not performed, and it is possible to effectively prevent image quality deterioration (overcorrection or the like) due to the point image restoration process.

As shown in FIG. 24, when the luminance distribution of source image data does not incline toward the high luminance side, image quality deterioration (overcorrection or the like) due to the point image restoration process is hardly conspicuous. According to this embodiment, a normal point image restoration process is performed for image data in which image quality deterioration (overcorrection or the like) due to the point image restoration process is hardly conspicuous, and it is possible to obtain recovered image data with image quality recovered satisfactorily.

<Specific Example of High Luminance Scene>

In this example, as described above, the adjustment of the restoration intensity is controlled according to whether or not source image data inclines toward the high luminance side (that is, whether or not source image data corresponds to a high luminance scene), and image quality deterioration (overcorrection or the like) due to the point image restoration process is effectively prevented. Determination regarding whether or not source image data inclines toward the high luminance side, that is, whether or not source image data corresponds to a high luminance scene can be performed based on the luminance distribution (distribution of brightness) in which image quality deterioration is likely to occur or is likely conspicuous due to the point image restoration process.

Specifically, as the determination method of whether or not source image data inclines toward the high luminance side (that is, whether or not source image data corresponds to a high luminance scene), a method based on "whether or not a luminance value of a frequency peak position of the luminance distribution (distribution of brightness) of source image data is equal to or greater than a threshold value (first threshold value)", "the proportion of luminance values equal to or greater than the first threshold value in the luminance distribution (distribution of brightness) of source image data is equal to or greater than a second threshold value", or the like is considered.

For example, the restoration control unit 38 performs control such that the restoration processing unit 39 controls the point image restoration process based on the luminance value (see reference numeral "$L_p$" of FIG. 23) indicating the peak (see reference numeral "P" of FIG. 23) of the frequency in the luminance distribution indicating the frequency per luminance of pixels constituting source image data. Specifically, when the luminance value indicating the peak of the frequency in the luminance distribution indicating the frequency per luminance of the pixels constituting source image data is equal to or greater than a threshold value (first threshold value), the restoration control unit 38 may determine that source image data satisfies the luminance state of the high luminance scene.

In this way, in the determination based on "whether or not the luminance value of the frequency peak position of the luminance distribution (distribution of brightness) of source image data is equal to or greater than the threshold value (first threshold value)", a value corresponding to about 80% of the highest luminance value may be set as the threshold value used herein. For example, when the luminance value can be expressed in 256 gradations of 0 to 255, the luminance value "205" corresponding to about 80% of the highest luminance value can be used as the threshold value. Accordingly, the restoration control unit 38 may determine that source image data corresponds to a high luminance scene "when the luminance value of the frequency peak position of the luminance distribution of source image data is equal to or greater than "205"", and may determine that source image data does not correspond to a high luminance scene "when the luminance value of the frequency peak position of the luminance distribution of source image data is less than "205"".

For example, the restoration control unit 38 may perform control such that the restoration processing unit 39 controls the point image restoration process based on the proportion of pixels equal to or greater than a first luminance value in the luminance distribution indicating the frequency per luminance of the pixels constituting source image data. Specifically, the restoration control unit 38 may determine that source image data satisfies the luminance state of the high luminance scene when the proportion of the pixels having a luminance value equal to or greater than the first threshold value in the luminance distribution indicating the frequency per luminance of the pixels constituting source image data is equal to or greater than the second threshold value.

In this way, in the determination based on "whether or not the proportion of the luminance values equal to or greater than the first threshold value in the luminance distribution (distribution of brightness) of source image data is equal to or greater than the second threshold value", a value corresponding to about 80% of the highest luminance value can be used as the first threshold value, and a value corresponding to about 50% of the total number of pixels can be used as the second threshold value. For example, when the luminance value can be expressed in 256 gradations of 0 to 255, the luminance value "205" corresponding to about 80% of the highest luminance value may be used as the first threshold value, and the number of pixels which is 50% of the total number of pixels constituting source image data may be used as the second threshold value. Accordingly, the restoration control unit 38 may determine that source image data corresponds to a high luminance scene "when the proportion of pixels having the luminance value equal to or greater than "205" in the luminance distribution of source image data is equal to or greater than 50% of the number of pixels of the entire image" and may determine that source image data does not correspond to a high luminance scene "when the proportion of pixels having the luminance value equal to or greater than "205" in the luminance distribution of source image data is less than 50% of the number of pixels of the entire image".

<Second Embodiment>

In this embodiment, description of the same configuration and action as the first embodiment described above will not be repeated.

Figure 25:
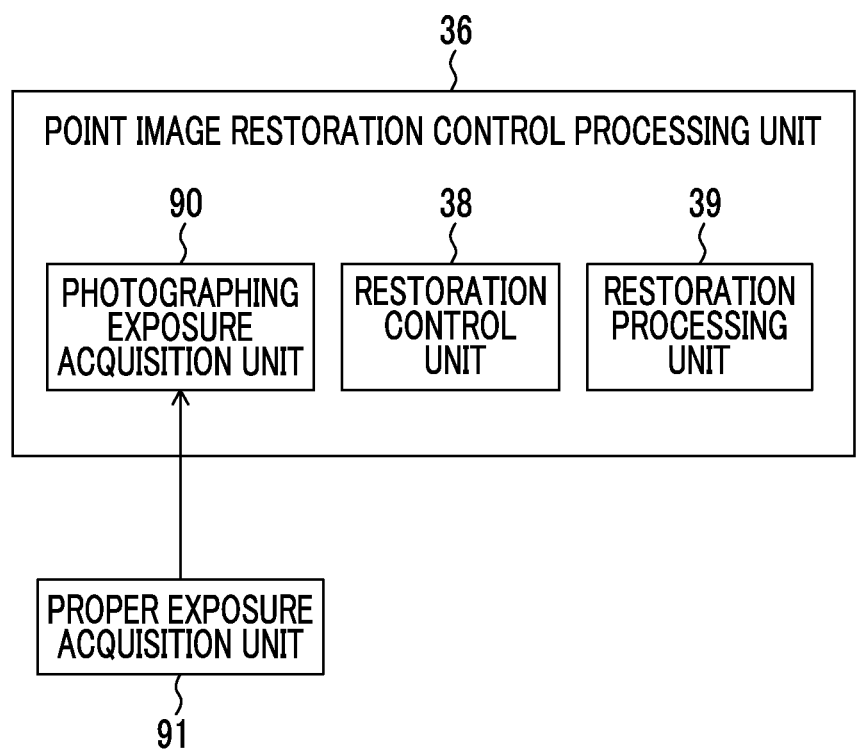
FIG. 25 is a functional block diagram showing an example of a point image restoration control processing unit according to a second embodiment.

FIG. 25 is a functional block diagram showing an example of a point image restoration control processing unit 36 of the second embodiment.

The point image restoration control processing unit 36 of this embodiment has a photographing exposure acquisition unit 90 which acquires a photographing exposure as the exposure of the optical system for acquiring source image data, instead of the luminance distribution acquisition unit 37 (see FIG. 15).

The restoration control unit 38 performs control such that the restoration processing unit 39 controls the point image restoration process based on the photographing exposure acquired by the photographing exposure acquisition unit 90. Specifically, the restoration control unit 38 performs control such that the restoration processing unit 39 controls the restoration process based on the difference between a proper exposure acquired by a proper exposure acquisition unit 91 and the photographing exposure.

The "photographing exposure" used herein is an exposure at the time of photographing with the digital camera (image capture device) 10, and is a value which can fluctuate according to photographing conditions (a combination of a diaphragm value (F value) and a shutter speed) for acquiring source image data.

The "proper exposure" is an exposure which is estimated to be proper, and may be determined according to a photometry mode using an exposure meter (not shown). The proper exposure is acquired by the proper exposure acquisition unit 91 using an arbitrary method. For example, when the proper exposure is determined in advance, the proper exposure determined in advance may be stored in a memory (not shown) and the proper exposure may be read and acquired as necessary. When the proper exposure fluctuates according to the photographing conditions or the like, the proper exposure may be calculated and acquired by the proper exposure acquisition unit 91. Information of the acquired proper exposure is sent from the proper exposure acquisition unit 91 to the photographing exposure acquisition unit 90.

The exposure meter is not particularly limited, and an exposure meter may be embedded in the camera body 14, like a through the lens (TTL) type exposure meter, or an exposure meter may be externally mounted on the camera body 14. A reflected light type exposure meter which measures reflected light of an object may be used, or an incident light type exposure meter which measures light other than reflected light of an object may be used. Furthermore, the photometry mode is not particularly limited, and a multi-division photometry mode in which photometry is performed over the entire image, a centrally weighted average photometry mode in which photometry is performed in the central portion of the image with emphasis, a spot photometry mode in which photometry is performed based on an extremely narrow portion of an object, or other photometry modes may be used.

The photographing exposure acquisition unit 90 can acquire the photographing exposure using an arbitrary method. For example, when the photographing exposure is stored in the memory (not shown), the photographing exposure may be acquired directly from the memory, or the photographing exposure may be calculated and acquired indirectly from data, such as source image data, a photometric value of the exposure meter, and the photographing conditions. In particular, since the photographing exposure is individually changeable by the user, for example, when the user sets the shutter speed or the diaphragm value (F value) manually or when the user sets or changes exposure setting (EV value) manually, the photographing exposure can be a value different from the proper exposure.

The proper exposure is a proper exposure which is derived from the viewpoint of preventing an image from being excessively dark or excessively bright. However, actually, there may be a case where the proper exposure is not necessarily a proper value due to various factors, and the proper exposure does not meet user's preference or needs. Accordingly, a function of allowing the user to change the photographing exposure is a function which is mounted in the digital camera 10 (the user interface 29, the camera body controller 28, or the like) in order to realize photographing according to user's preference or needs by complementing imperfection of the proper exposure.

In this way, when the photographing exposure can be set to a value different from the proper exposure, if the photographing exposure is set such that the EV value becomes great (the image becomes bright), the image (source image data) obtained through photographing easily corresponds to the high luminance scene inclining toward the high luminance side.

In this embodiment, when source image data is acquired with the photographing exposure such that photographic image data (source image data) easily corresponds to the high luminance scene inclining toward the high luminance side, the restoration intensity of the point image restoration process is lowered or the point image restoration process is not performed, whereby image quality deterioration (overcorrection or the like) due to the point image restoration process is prevented.

Specifically, the restoration control unit 38 determines whether or not the difference between the photographing exposure for acquiring source image data and the proper exposure is equal to or greater than a threshold value (third threshold value), and controls the intensity of the restoration process based on the determination result. The threshold value (third threshold value) used herein is appropriately determined according to whether or not there is a high possibility that an image inclining toward the high luminance side (an image corresponding to the high luminance scene) is photographed, and can be determined by the relative magnitude of the photographing exposure with respect to the proper exposure.

For example, when the difference between the photographing exposure and the proper exposure is equal to or greater than a threshold value t3 (third threshold value) ((photographing exposure−proper exposure)≥t3), the restoration control unit 38 may perform control such that the restoration processing unit 39 performs the point image restoration process such that the restoration intensity is weakened compared to a case where the difference between the photographing exposure and the proper exposure is less than the threshold value t3, and does not perform and skips the point image restoration process.

Various processes of "a point image restoration process of normal restoration intensity", "a point image restoration process of weaker restoration intensity than normal", and "skipping of the point image restoration process" may be switched according to the magnitude of the difference between the photographing exposure and the proper exposure. For example, the restoration control unit 38 may perform control such that the restoration processing unit 39 performs "the point image restoration process of normal restoration intensity" when the difference between the photographing exposure and the proper exposure is less than the threshold value t3 (third threshold value) ((photographing exposure−proper exposure)<t3), performs "the point image restoration process of weaker restoration intensity than normal" when the difference between the photographing exposure and the proper exposure is equal to or greater than the threshold value t3 and less than another threshold value t4 (fourth threshold value; however, "t4>t3") (t4>(photographing exposure−proper exposure)≥t3), and "skips the point image restoration process" when the difference between the photographing exposure and the proper exposure is equal to or greater than the threshold value t4 (t4≤(photographing exposure−proper exposure)).

"The difference between the photographing exposure and the proper exposure" may be based on the difference between the absolute values of the photographing exposure and the proper exposure, and may be based on other indexes indicating the difference between the absolute values of the photographing exposure and the proper exposure. As a setting form of the EV value, for example, there is a case where a plurality of stages of EV value candidates are determined on an overexposure side and/or an underexposure side based on the proper exposure, and the user can appropriately select the photographing exposure from among the EV value candidates. For example, there is a case where the EV value candidates of three stages (+1 to +3) on the overexposure side and three stages (−1 to −3) on the underexposure side are determined in addition to the proper exposure (0), and the user can appropriately select the photographing exposure from among the EV value candidates (+3 to −3). In this case, for example, the restoration control unit 38 may perform control such that the restoration processing unit 39 performs "the point image restoration process of normal restoration intensity" when "+2" is set as the above-described threshold value t3 (third threshold value) and the EV value candidates (that is, "−3 to +1") less than "+2" are selected by the user, and performs "the point image restoration process of weaker restoration intensity than normal" when the EV value candidates (that is, "+2 to +3") equal to or greater than "+2" are selected by the user. Furthermore, for example, the restoration control unit 38 may set "+1" as the threshold value t3 (third threshold value) and "+2" as the threshold value t4 (fourth threshold value), and similarly to the above-described form, may perform control such that the restoration processing unit 39 switches various processes of "the point image restoration process of normal restoration intensity", "the point image restoration process of weaker restoration intensity than normal", and "skipping of the point image restoration process".

The threshold values (third threshold value and fourth threshold value) used for determining "whether or not source image data is acquired with the photographing exposure with which source image data is likely to correspond to the high luminance scene inclining toward the high luminance side" may be set in advance, may be individually set or changed by the user, or may be set or changed according to the photographing conditions, such as a photographing mode.

Figure 26:
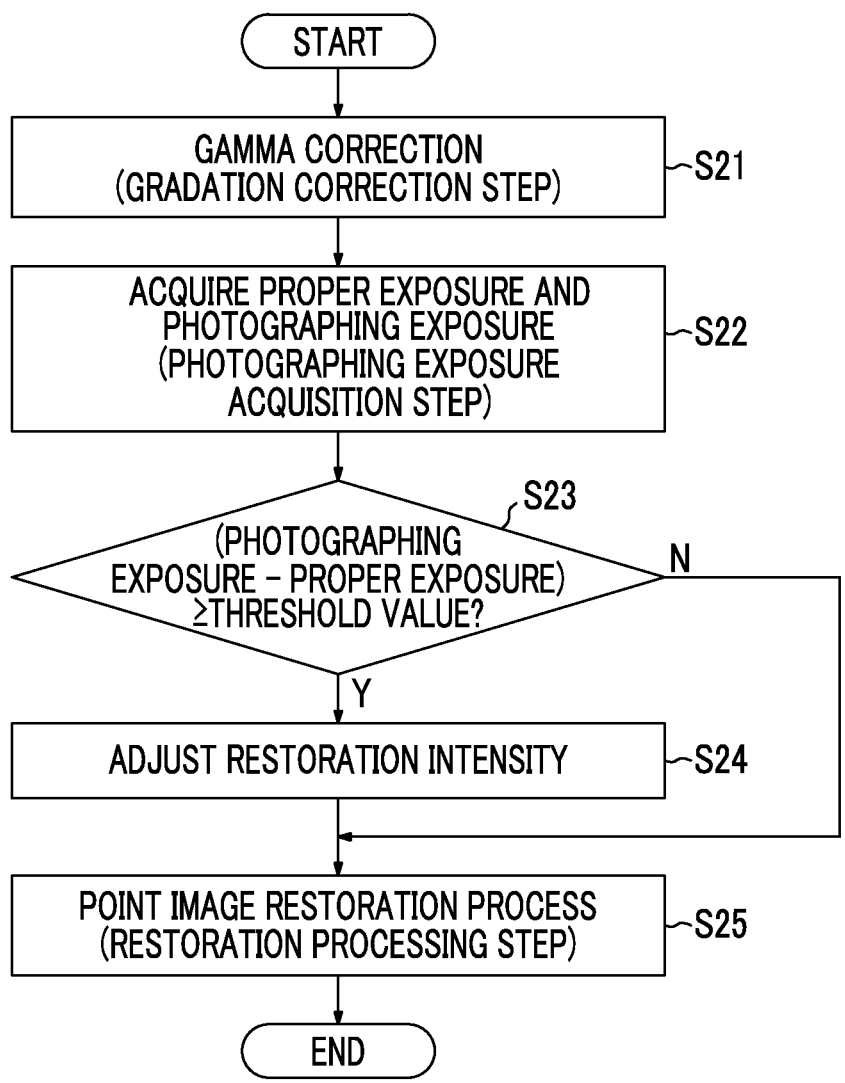
FIG. 26 is a flowchart showing the flow of an image process including a point image restoration process according to the second embodiment.

FIG. 26 is a flowchart showing the flow of an image process including the point image restoration process of the second embodiment. FIG. 26 shows a process flow example when image quality deterioration (overcorrection or the like) due to the point image restoration process is prevented by lowering the restoration intensity of the point image restoration process when the difference between the photographing exposure and the proper exposure is equal to or greater than the threshold value (third threshold value) compared to a case where the difference between the photographing exposure and the proper exposure is less than the threshold value (third threshold value), or skipping the point image restoration process.

In this example, prior to the point image restoration process, the gamma correction process is performed for the source image data in the image processing unit (gamma correction processing unit) 35 (S21 of FIG. 26: gradation correction step).

Source image data after the gamma correction process is input to the point image restoration control processing unit 36, the proper exposure is acquired by the proper exposure acquisition unit 91, and the photographing exposure is acquired by the photographing exposure acquisition unit 90 (S22: photographing exposure acquisition step).

The restoration control unit 38 determines whether or not the difference between the photographing exposure and the proper exposure is equal to or greater than the threshold value (third threshold value) based on the acquired proper exposure and photographing exposure (S23). As described above, this step is a step of determining whether or not photographing is performed under a condition that source image data acquired through photographing is likely to correspond to the high luminance scene inclining toward the high luminance side, and the threshold value (third threshold value) as a determination criterion is appropriately determined.

When the difference between the photographing exposure and the proper exposure is equal to or greater than the threshold value (third threshold value) (Y of S23), the restoration control unit 38 controls the restoration processing unit 39, the restoration intensity of the point image restoration process is adjusted (S24), and the point image restoration process based on the restoration intensity after adjustment is performed by the restoration processing unit 39 (S25). Specifically, when the difference between the photographing exposure and the proper exposure is equal to or greater than the threshold value (third threshold value), the restoration control unit 38 performs control such that the restoration processing unit 39 lowers the restoration intensity of the point image restoration process compared to a case where the difference between the photographing exposure and the proper exposure is less than the threshold value (third threshold value). The restoration control unit 38 may perform control such that the restoration processing unit 39 does not perform the point image restoration process for source image data when the difference between the photographing exposure and the proper exposure is equal to or greater than the threshold value (third threshold value).

As in the first embodiment, the adjustment of the restoration intensity of the point image restoration process can be executed by switching the restoration filter, that is, by changing the filter coefficient, by changing the restoration gain (amplification factor) of the difference between image data before and after the point image restoration process, or by both of them (see FIG. 17). Similarly, when the point image restoration process is not performed for source image data, source image data may be sent to the post stage while substantially skipping the filter application unit 51 and the gain adjustment unit 52, or the point image restoration process may be performed by the filter application unit 51 and the gain adjustment unit 52 such that image data before and after the point image restoration process is not changed.

When the difference between the photographing exposure and the proper exposure is less than the threshold value (third threshold value) (N of S23), the restoration control unit 38 controls the restoration processing unit 39, the adjustment of the restoration intensity of the point image restoration process is not performed, and the point image restoration process based on normal restoration intensity is performed by the restoration processing unit 39 (S25).

<Modification Examples>

In the above-described embodiments, an example where, when the image (source image data) inclines toward the high luminance side or when there is a high possibility that the image (source image data) inclining toward the high luminance side is photographed, in order to prevent image quality deterioration (overcorrection or the like) due to the point image restoration process, the restoration intensity of the point image restoration process is weaker than normal, or the point image restoration process is skipped is shown. An image process for preventing image quality deterioration (overcorrection or the like) due to the point image restoration process is not limited to these image processes, and other image processes may be performed for source image data, in addition to "the point image restoration process of weaker restoration intensity than normal" or "skipping of the point image restoration process".

Figure 27:
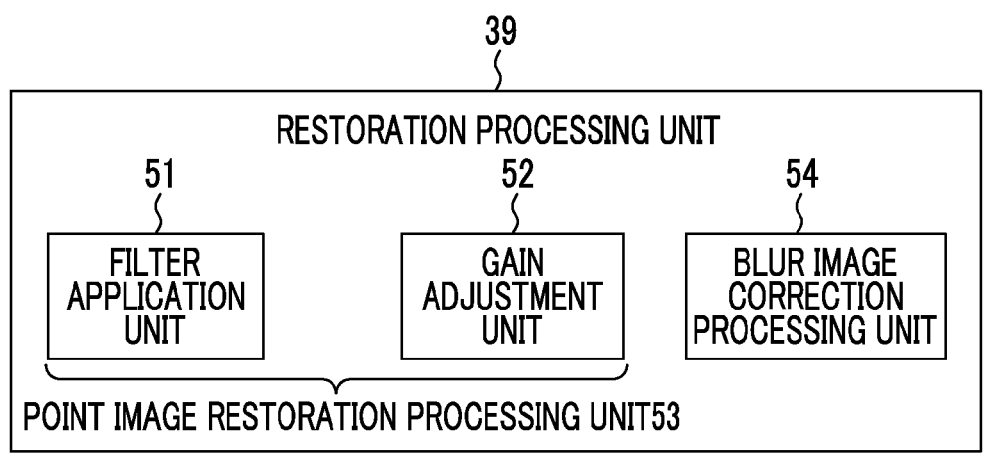
FIG. 27 is a functional block diagram showing a modification example of the restoration processing unit.

For example, the restoration processing unit 39 may have a blur image correction processing unit 54, in addition to the point image restoration processing unit 53 (the filter application unit 51 and the gain adjustment unit 52) (see FIG. 27). The blur image correction processing unit 54 performs a blur image correction process different from the point image restoration process of the point image restoration processing unit 53, and subjects an input image (source image data) to an image process not based on the point spread function of the optical system. As the blur image correction process, for example, like a contour enhancement process, an image process for extending (enhancing) the high frequency component of the input image (source image data) is considered.

Accordingly, for example, in an embodiment in which the point image restoration process is controlled based on the luminance distribution of source image data (see the "first embodiment" described above), when it is determined that source image data corresponds to the high luminance scene inclining toward the high luminance side, the blur image correction process of the blur image correction processing unit 54 may be performed for source image data. That is, the restoration control unit 38 performs control such that the restoration processing unit 39 further performs the blur image correction process of the blur image correction processing unit 54 for image data (recovered image data) subjected to the point image restoration process with weaker restoration intensity than normal when source image data satisfies the luminance state of the high luminance scene inclining toward the high luminance side. Furthermore, the restoration control unit 38 may perform control such that the restoration processing unit 39 skips the point image restoration process for source image data and performs the blur image correction process of the blur image correction processing unit 54 for source image data when source image data satisfies the luminance state of the high luminance scene.

In the embodiment in which the point image restoration process is controlled based on the photographing exposure (see the "second embodiment" described above), when it is determined that there is a high possibility that source image data corresponding to the high luminance scene inclining toward the high luminance side is acquired based on the photographing exposure, the blur image correction process of the blur image correction processing unit 54 may be performed for source image data. That is, the restoration control unit 38 performs control such that the restoration processing unit 39 further performs the blur image correction process of the blur image correction processing unit 54 for image data (recovered image data) subjected to the point image restoration process with weaker restoration intensity than normal when the difference between the photographing exposure and the proper exposure is equal to or greater than the threshold value. Furthermore, the restoration control unit 38 may perform control such that the restoration processing unit 39 skips the point image restoration process for source image data and performs the blur image correction process for the source image data in the blur image correction processing unit 54 when the difference between the photographing exposure and the proper exposure is equal to or greater than the threshold value.

<Other Modification Examples>

The digital camera 10 described above is just for illustration, and the invention can be applied to other configurations. Each functional configuration can be appropriately implemented by arbitrary hardware, software, or a combination thereof. For example, the invention can be applied to a program which causes a computer to execute an image processing method (processing steps or processing procedures) in each device and processing unit (the camera body controller 28, the image processing unit 35, the gamma correction processing unit 33, the point image restoration control processing unit 36, or the like), a computer-readable recording medium (non-transitory recording medium) having the program recorded thereon, or a computer on which the program can be installed.

<Application Example to EDoF System>

Although the restoration process in the embodiments described above is an image process for recovering and correcting point spread (point image blur) according to a specific photographing condition (for example, a diaphragm value, an F value, a focal distance, a lens type, or a combination thereof) to restore an original object image, an image restoration process to which the invention can be applied is not limited to the restoration process in the embodiments described above. For example, the restoration process according to the invention can also be applied to a restoration process on image data photographed and acquired by an optical system (a photographing lens or the like) having an extended depth of field (focus) (extended depth of field (EDoF)). Image data of a blurred image photographed and acquired in a state where the depth of field (depth of focus) is extended by the EDoF optical system is subjected to the restoration process, whereby image data of high resolution in a focused state over a wide range can be restored and generated. In this case, the restoration process is performed using a restoration filter based on a point spread function (PSF, OTF, MTF, PTF, or the like) of the EDoF optical system and having a filter coefficient set such that satisfactory image restoration can be performed within a range of an extended depth of field (depth of focus).

Hereinafter, an example of a system (EDoF system) relating to restoration of image data photographed and acquired through the EDoF optical system will be described. In an example described below, although an example where a luminance signal (Y data) obtained from image data (RGB data) after a demosaic process is subjected to a restoration process will be described, the timing of the restoration process is not particularly limited, and for example, "image data (mosaic image data) before a demosaic process" or "image data (demosaic image data) after a demosaic process and before a luminance signal conversion process" may be subjected to the restoration process.

Figure 28:
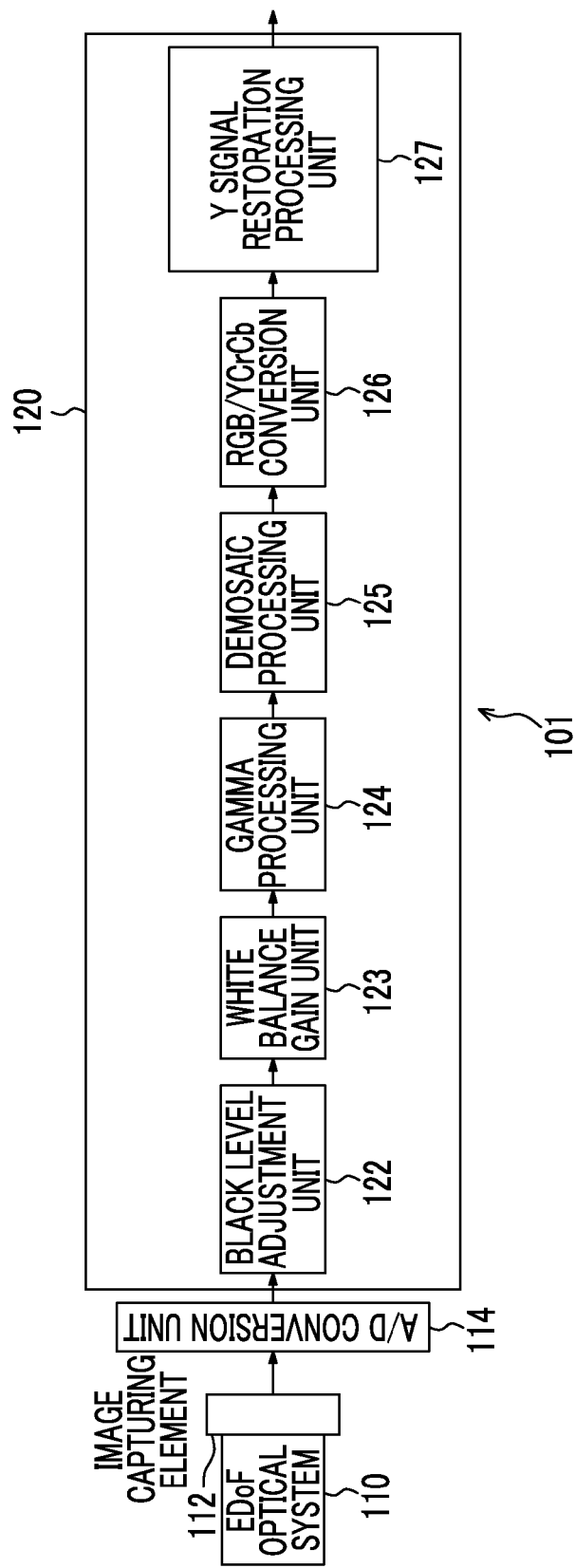
FIG. 28 is a block diagram showing a form of an image capture module including an EDoF optical system.

FIG. 28 is a block diagram showing a form of an image capture module 101 including an EDoF optical system. The image capture module 101 (digital camera or the like) of this example includes an EDoF optical system (lens unit) 110, an image capture element 112, an AD conversion unit 114, and a restoration processing block (image processing unit) 120.

Figure 29:
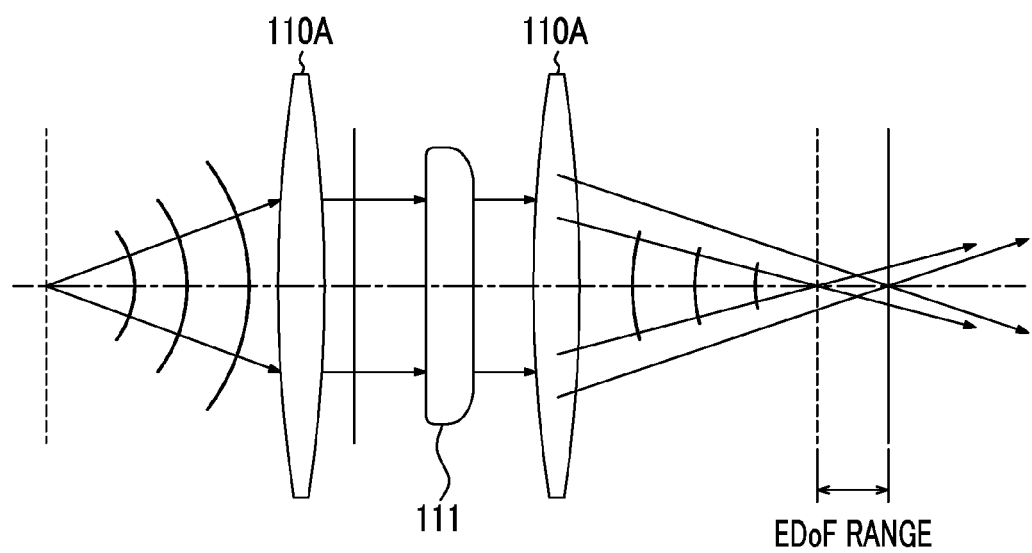
FIG. 29 is a diagram showing an example of the EDoF optical system.

FIG. 29 is a diagram showing an example of an EDoF optical system 110. The EDoF optical system 110 of this example has a single-focus fixed photographing lens 110A, and an optical filter 111 which is arranged at a pupil position. The optical filter 111 modulates a phase, and makes the photographing lens 110A constituting the EDoF optical system 110 have an extended depth of field such that an extended depth of field (depth of focus) (EDoF) is obtained. In this way, the photographing lens 110A and the optical filter 111 constitute a lens unit which modulates a phase to extend a depth of field.

The EDoF optical system 110 includes other components as necessary, and for example, a diaphragm (not shown) is provided near the optical filter 111. The optical filter 111 may be one sheet or may be constituted by combining a plurality of sheets. The optical filter 111 is only an example of optical phase modulation means, and the EDoF of the EDoF optical system 110 (the photographing lens 110A) may be implemented by other means. For example, instead of providing the optical filter 111, the EDoF of the EDoF optical system 110 may be implemented by the photographing lens 110A designed to have the same function as the optical filter 111 of this example.

That is, the EDoF of the EDoF optical system 110 can be implemented by various means for changing the wavefront of imaging on the light receiving surface of the image capture element 112. For example, "an optical element with a variable thickness", "an optical element with a variable refractive index (a refractive index distribution type wavefront modulation lens or the like)", "an optical element with a variable thickness or refractive index coating on the lens surface or the like (a wavefront modulation hybrid lens, an optical element formed on the lens surface as a phase plane, or the like)", or "a liquid crystal element capable of modulating a phase distribution of light (a liquid crystal spatial phase modulation element or the like)" may be used as EDoF means of the EDoF optical system 110. In this way, the invention can be applied to not only a case where image formation can be performed to be regularly dispersed by an optical wavefront modulation element (the optical filter 111 (phase plate)), but also a case where the same dispersed images as the case of using the optical wavefront modulation element can be formed by the photographing lens 110A itself without using the optical wavefront modulation element.

The EDoF optical system 110 shown in FIGS. 28 and 29 can be reduced in size since a focus adjustment mechanism which performs focus adjustment mechanically can be omitted, and can be suitably mounted in a camera-equipped mobile phone or a mobile information terminal portable.

An optical image after passing through the EDoF optical system 110 having the EDoF is formed on the image capture element 112 shown in FIG. 28 and is converted to an electrical signal here.

The image capture element 112 is constituted of a plurality of pixels arranged in a matrix in a predetermined pattern array (Bayer array, G stripe R/G full checkered pattern, X-Trans array, honeycomb array, or the like), and each pixel includes a microlens, a color filter (in this example, an RGB color filter), and a photodiode. An optical image incident on the light receiving surface of the image capture element 112 through the EDoF optical system 110 is converted to a signal charge in the amount according to the amount of incident light by each photodiode arranged on the light receiving surface. The signal charge of R, G, and B accumulated in each photodiode is sequentially output as a voltage signal (image signal) for each pixel.

The AD conversion unit 114 converts the analog R, G, and B image signals output from the image capture element 112 for each pixel to digital RGB image signals. The digital image signals converted to the digital image signals by the AD conversion unit 114 are applied to the restoration processing block 120.

The restoration processing block 120 includes, for example, a black level adjustment unit 122, a white balance gain unit 123, a gamma processing unit 124, a demosaic processing unit 125, an RGB/YCrCb conversion unit 126, and a Y signal restoration processing unit 127.

The black level adjustment unit 122 subjects the digital image signals output from the AD conversion unit 114 to black level adjustment. For the black level adjustment, a known method may be used. For example, when focusing on a certain effective photoelectric conversion element, the average of signals for dark current amount acquisition corresponding to a plurality of OB photoelectric conversion elements included in a photoelectric conversion element line including the effective photoelectric conversion element is determined, and the black level adjustment is performed by subtracting the average from the signal for dark current amount acquisition corresponding to the effective photoelectric conversion element.

The white balance gain unit 123 performs gain adjustment according to a white balance gain of each of the color signals of RGB included in the digital image signals with adjusted black level data.

The gamma processing unit 124 performs gamma correction to perform gradation correction, such as halftone, such that the R, G, and B image signals subjected to the white balance adjustment have desired gamma characteristics.

The demosaic processing unit 125 subjects the R, G, and B image signals after gamma correction to a demosaic process. Specifically, the demosaic processing unit 125 subjects the R, G, and B image signals to a color interpolation process to generate a set of image signals (R signal, G signal, and B signal) output from the respective light receiving pixels of the image capture element 112. That is, although a pixel signal from each light receiving pixel is one of the R, G, and B image signals before color demosaic process, a set of three pixel signals of R, and B signals corresponding to each light receiving pixel is output after color demosaic process.

The RGB/YCrCb conversion unit 126 converts the R, G, and B signals of each pixel subjected to the demosaic process to a luminance signal Y and color difference signals Cr and Cb and outputs the luminance signal Y and the color difference signals Cr and Cb of each pixel.

The Y signal restoration processing unit 127 subjects the luminance signal Y output from the RGB/YCrCb conversion unit 126 to a restoration process based on a restoration filter stored in advance. The restoration filter is constituted of, for example, a deconvolution kernel (corresponding to the number of taps of M=7 and N=7) having a kernel size of 7×7, and a calculation coefficient (corresponding to restoration gain data, filter coefficient) corresponding to the deconvolution kernel, and is used for a deconvolution process (reverse convolution calculation process) of phase modulation of the optical filter 111. For the restoration filter, one corresponding to the optical filter 111 is stored in a memory (not shown) (for example, a memory incidentally attached with the Y signal restoration processing unit 127). The kernel size of the deconvolution kernel is not limited to 7×7.

Figure 30:
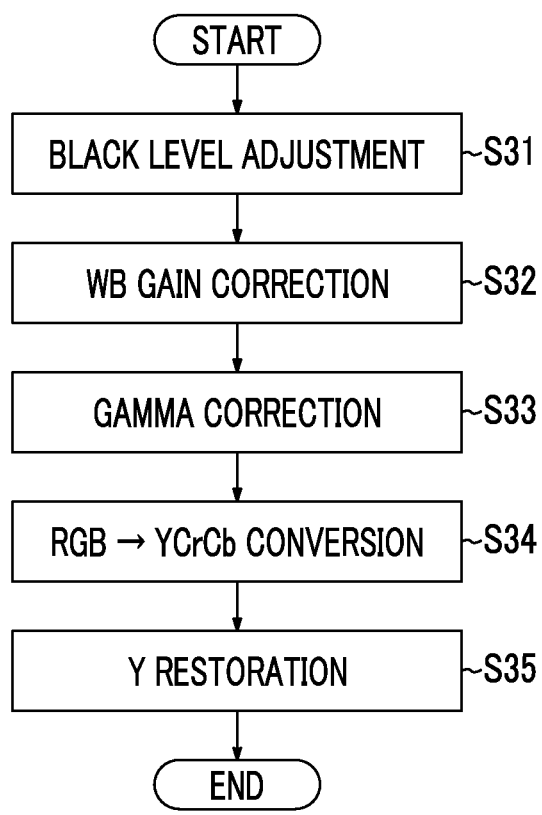
FIG. 30 is a diagram showing an example of a restoration processing flow in a restoration processing block shown in FIG. 28.

Next, the restoration process by the restoration processing block 120 will be described. FIG. 30 is a diagram showing an example of a restoration process flow by the restoration processing block 120 shown in FIG. 28.

The digital image signal is applied from the AD conversion unit 114 to one input of the black level adjustment unit 122, black level data is applied to the other input of the black level adjustment unit 122, and the black level adjustment unit 122 subtracts black level data from the digital image signal and outputs the digital image signal black level data subtracted to the white balance gain unit 123 (S31). With this, no black level component is included in the digital image signal, and a digital image signal indicating a black level becomes 0.

Image data after the black level adjustment is sequentially subjected to the processes by the white balance gain unit 123 and the gamma processing unit 124 (S32 and S33).

The R, G, and B signals subjected to gamma correction are subjected to the demosaic process in the demosaic processing unit 125 and are then converted to the luminance signal Y and the color difference signals Cr and Cb in the RGB/YCrCb conversion unit 126 (S34).

The Y signal restoration processing unit 127 subjects the luminance signal Y to the restoration process to apply the deconvolution process of phase modulation of the optical filter 111 of the EDoF optical system 110 (S35). That is, the Y signal restoration processing unit 127 performs the deconvolution process (reverse convolution calculation process) of a luminance signal (in this case, a luminance signal of 7×7 pixels) corresponding to a pixel group of a predetermined unit centering on an arbitrary pixel to be processed and the restoration filter (the 7×7 deconvolution kernel and the calculation coefficient) stored in the memory or the like in advance. The Y signal restoration processing unit 127 performs the restoration process for removing image blur of the entire image by repeating the deconvolution process of each pixel group of the predetermined unit so as to cover the entire area of the image capture surface. The restoration filter is determined according to the position of the center of the pixel group subjected to the deconvolution process. That is, the common restoration filter is applied to adjacent pixel groups. In addition, in order to simplify the restoration process, it is preferable to apply the common restoration filter to all pixel groups.

Figure 31:
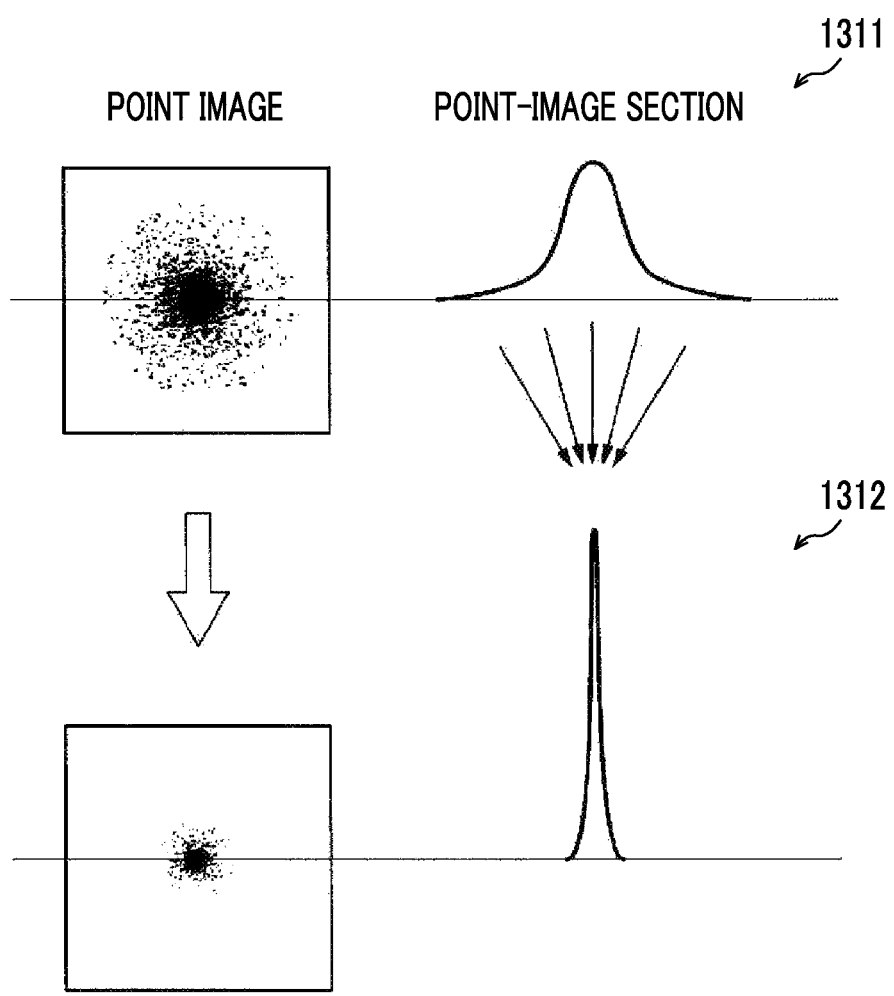
FIG. 31 is a diagram showing a restoration example of an image acquired through the EDoF optical system.

As indicated by reference numeral 1311 of FIG. 31, a point image (optical image) of the luminance signal after passing through the EDoF optical system 110 is formed on the image capture element 112 as a great point image (blurred image), but is restored to a small point image (image of high resolution) by the deconvolution process in the Y signal restoration processing unit 127 as indicated by reference numeral 1312 of FIG. 31.

As described above, the restoration process is applied to the luminance signal after the demosaic process, whereby it is not necessary to separately provide the parameters of the restoration process for RGB, and it is possible to accelerate the restoration process. Furthermore, instead of putting together the R, G, and B image signals corresponding to the R, G, and B pixels at discrete positions in one unit and performing the deconvolution process, the luminance signals of adjacent pixels are put together in a predetermined unit and the common restoration filter is applied to this unit and the deconvolution process is performed; therefore, the accuracy of the restoration process is improved. In regards to the color difference signals Cr and Cb, resolution does not need to be increased by the restoration process in terms of image quality because of the visual characteristic of human eyes. Furthermore, when recording an image in a compression format, such as JPEG, the color difference signals are compressed at a higher compression rate than the luminance signal; therefore, there is less necessity to increase resolution by the restoration process. Consequently, it is possible to achieve improvement of restoration accuracy and simplification and acceleration of the process.

The point image restoration process according to the respective embodiments of the invention can be applied to the restoration process of the EDoF system described above. That is, in the restoration process of the restoration processing block 120 (Y signal restoration processing unit 127) (S35 of FIG. 30), "the luminance distribution of source image data may be acquired and the restoration process may be controlled based on the characteristic of the luminance value equal to or greater than the threshold value (first threshold value) in the luminance distribution", or "the photographing exposure for acquiring source image data may be acquired and the restoration process may be controlled based on the photographing exposure".

In the respective embodiments described above, although an aspect in which the point image restoration control processing unit 36 is provided in the camera body 14 (camera body controller 28) of the digital camera 10 has been described, the point image restoration control processing unit 36 may be provided in other devices, such as the computer 60 or the server 80.

For example, for processing image data in the computer 60, image data may be subjected to the point image restoration process by the point image restoration control processing unit provided in the computer 60. Furthermore, when the server 80 includes a point image restoration control processing unit, for example, image data may be transmitted from the digital camera 10 or the computer 60 to the server 80, image data may be subjected to the point image restoration process in the point image restoration control processing unit of the server 80, and image data (recovered image data) after the point image restoration process may be transmitted and supplied to the transmission source.

An aspect to which the invention can be applied is not limited to the digital camera 10, the computer 60, and the server 80, and the invention can be applied to mobile devices having an image capture function and functions (call handling function, communication function, and other computer functions) other than image capturing, in addition to cameras having image capturing as a major function. As another aspect to which the invention can be applied, for example, mobile phones having a camera function, smartphones, personal digital assistants (PDAs), and portable game machines are given. Hereinafter, an example of a smartphone to which the invention can be applied will be described.

<Configuration of Smartphone>

Figure 32:
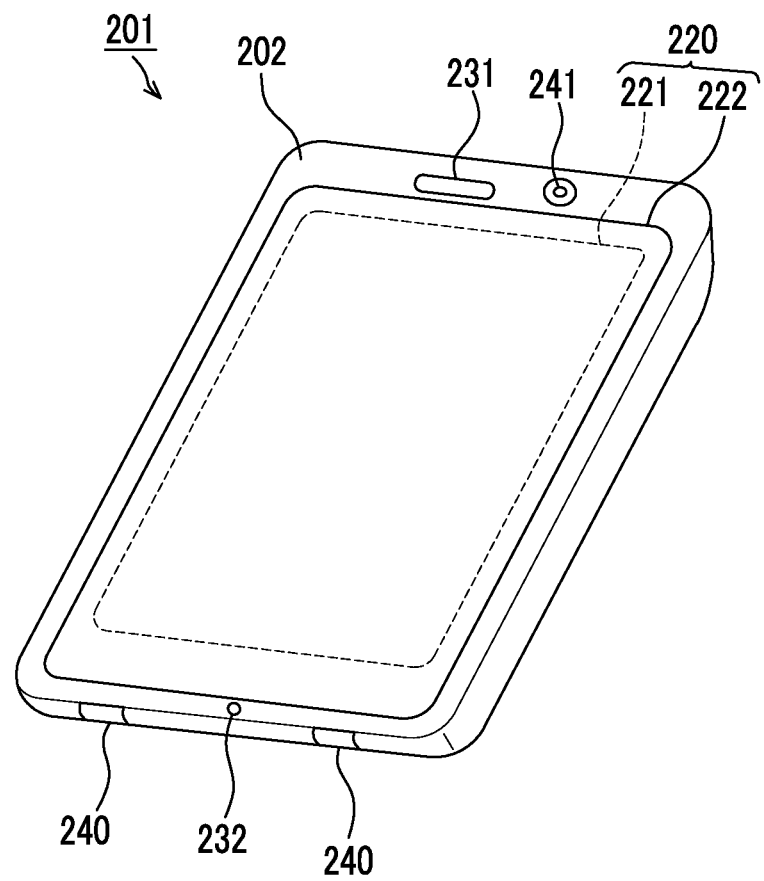
FIG. 32 shows the appearance of a smartphone which is an embodiment of a photographing device of the invention.

FIG. 32 shows the appearance of a smartphone 201 which is an embodiment of a photographing device of the invention. The smartphone 201 shown in FIG. 32 has a flat plate-like housing 202, and includes, on one surface of the housing 202, a display input unit 220 in which a display panel 221 as a display unit and an operation panel 222 as an input unit are integrated. The housing 202 includes a speaker 231, a microphone 232, an operating unit 240, and a camera unit 241. The configuration of the housing 202 is not limited thereto, and for example, a configuration in which a display unit and an input unit are separated can be used, or a configuration in which a folding structure or a slide mechanism is provided.

Figure 33:
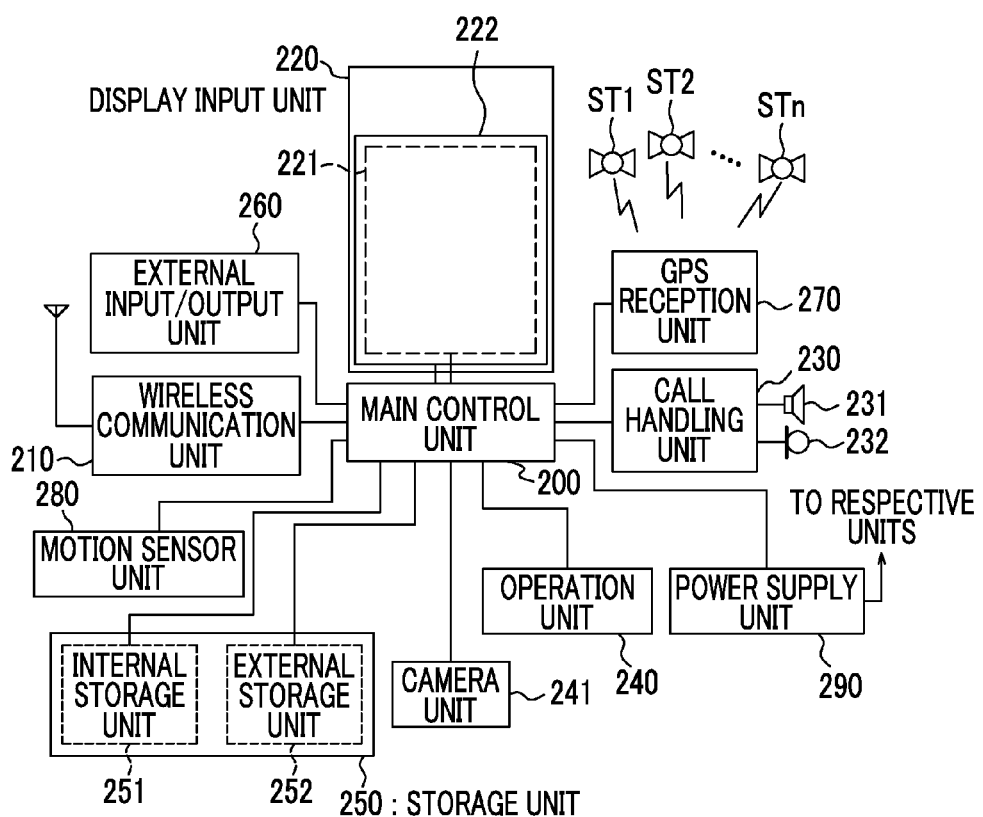
FIG. 33 is a block diagram showing the configuration of the smartphone shown in FIG. 32.

FIG. 33 is a block diagram showing the configuration of the smartphone 201 shown in FIG. 32. As shown in FIG. 33, the smartphone includes, as major components, a wireless communication unit 210, a display input unit 220, a call handling unit 230, an operating unit 240, a camera unit 241, a storage unit 250, an external input/output unit 260, a global positioning system (GPS) reception unit 270, a motion sensor unit 280, a power supply unit 290, and a main control unit 200. The smartphone 201 has, as a major function, a wireless communication function of performing mobile wireless communication through a base station device BS and a mobile communication network NW.

The wireless communication unit 210 performs wireless communication with the base station device BS in the mobile communication network NW according to an instruction of the main control unit 200. Transmission/reception of various kinds of file data, such as speech data or image data, electronic mail data, and the like, or reception of Web data, streaming data, or the like is performed using wireless communication.

The display input unit 220 is a so-called touch panel which displays images (still image and moving image), character information, or the like under the control of the main control unit 200 to visually transfer information to the user and detects a user's operation on the displayed information, and includes the display panel 221 and the operation panel 222.

The display panel 221 uses a liquid crystal display (LCD) or an organic electro-luminescence display (OELD) as a display device. The operation panel 222 is a device which is placed such that an image displayed on the display surface of the display panel 221 is visible, and detects one or a plurality of coordinates operated with the finger of the user or a stylus. If the device is operated with the finger of the user or the stylus, a detection signal generated due to the operation is output to the main control unit 200. Next, the main control unit 200 detects the operation position (coordinates) on the display panel 221 based on the received detection signal.

As shown in FIG. 32, the display panel 221 and the operation panel 222 of the smartphone 201 illustrated as an embodiment of a photographing device of the invention are integrated to constitute the display input unit 220, and the operation panel 222 is arranged so as to completely cover the display panel 221. When this arrangement is used, the operation panel 222 may have a function of detecting a user's operation in an area outside the display panel 221. In other words, the operation panel 222 may include a detection area (hereinafter, referred to as a display area) for a superimposed portion overlapping the display panel 221 and a detection area (hereinafter, referred to as a non-display area) for an outer edge portion not overlapping the display panel 221.

Although the size of the display area may completely match the size of the display panel 221, both do not necessarily match each other. The operation panel 222 may include two sensitive areas of an outer edge portion and an inside portion. In addition, the width of the outer edge portion is appropriately designed according to the size of the housing 202 or the like. Furthermore, as a position detection system which is used in the operation panel 222, a matrix switch system, a resistive film system, a surface acoustic wave system, an infrared system, an electromagnetic induction system, an electrostatic capacitance system, or the like is given, and any system can be used.

The call handling unit 230 includes a speaker 231 and a microphone 232, converts speech of the user input through the microphone 232 to speech data processable in the main control unit 200 and outputs speech data to the main control unit 200, or decodes speech data received by the wireless communication unit 210 or the external input/output unit 260 and outputs speech from the speaker 231. As shown in FIG. 32, for example, the speaker 231 can be mounted on the same surface as the surface on which the display input unit 220 is provided, and the microphone 232 may be mounted on the side surface of the housing 202.

The operating unit 240 is a hardware key, such as a key switch, and receives an instruction from the user. For example, as shown in FIG. 32, the operating unit 240 is a push button-type switch which is mounted on the side surface of the housing 202 of the smartphone 201, and is turned on when pressed with a finger or the like and is turned off by a restoration force of the spring or the like if the finger is released.

The storage unit 250 stores a control program or control data of the main control unit 200, application software, address data in association with the name, telephone number, and the like of a communication partner, data of transmitted and received electronic mail, Web data downloaded by Web browsing, downloaded content data, or temporarily stores streaming data or the like. The storage unit 250 is constituted of an internal storage unit 251 embedded in the smartphone and an external storage unit 252 which has a detachable external memory slot. The internal storage unit 251 and the external storage unit 252 constituting the storage unit 250 are implemented using a memory (for example, MicroSD (Registered Trademark) memory or the like) of a flash memory type, a hard disk type, a multimedia card micro type, or a card type, or a storage medium, such as a random access memory (RAM) or a read only memory (ROM).

The external input/output unit 260 plays a role of an interface with all external devices connected to the smartphone 201, and is provided for direct or indirect connection to other external devices by communication or the like (for example, universal serial bus (USB), IEEE1394 or the like), or a network (for example, Internet, wireless LAN, Bluetooth (Registered Trademark), radio frequency identification (RFID), infrared data association (IrDA) (Registered Trademark), ultra wideband (UWB) (Registered Trademark), ZigBee (Registered Trademark), or the like).

The external device connected to the smartphone 201 is, for example, a wired or wireless headset, a wired or wireless external charger, a wired or wireless data port, a memory card connected through a card socket, a subscriber identity module card (SIM)/user identity module card (UIM) card, an external audio-video device connected through an audio-video input/output (I/O) terminal, an external external audio-video device connected in a wireless manner, a smartphone connected in a wired or wireless manner, a personal computer connected in a wired or wireless manner, a PDA connected in a wired or wireless manner, a personal computer connected in a wired or wireless manner, an earphone, or the like. The external input/output unit can transfer data transmitted from the external devices to the respective components in the smartphone 201, or can transmit data in the smartphone 201 to the external devices.

The GPS reception unit 270 receives GPS signals transmitted from GPS satellites ST1 to STn according to an instruction of the main control unit 200, executes a positioning calculation process based on a plurality of received GPS signals, and detects the position of the smartphone 201 having latitude, longitude, and altitude. When positional information can be acquired from the wireless communication unit 210 or the external input/output unit 260 (for example, a wireless LAN), the GPS reception unit 270 may detect the position using the positional information.

The motion sensor unit 280 includes, for example, a three-axis acceleration sensor or the like, and detects physical motion of the smartphone 201 according to an instruction of the main control unit 200. The moving direction or acceleration of the smartphone 201 can be detected by detecting physical motion of the smartphone 201. The detection result is output to the main control unit 200.

The power supply unit 290 supplies power stored in a battery (not shown) to the respective units of the smartphone 201 according to an instruction of the main control unit 200.

The main control unit 200 includes a microprocessor, operates according to the control program or control data stored in the storage unit 250, and integrally controls the respective units of the smartphone 201. The main control unit 200 has a mobile communication control function of controlling the respective units of a communication system in order to perform speech communication or data communication through the wireless communication unit 210, and an application processing function.

The application processing function is implemented by the main control unit 200 operating according to application software stored in the storage unit 250. The application processing function is, for example, an infrared communication function of controlling the external input/output unit 260 to perform data communication with a device facing the smartphone 201, an electronic mail function of transmitting and receiving electronic mail, a Web browsing function of browsing Web pages, or the like.

The main control unit 200 has an image processing function of displaying video on the display input unit 220, or the like based on image data (still image or moving image data), such as received data or downloaded streaming data. The image processing function refers to a function of the main control unit 200 decoding image data, subjecting the decoding result to an image process, and displaying an image on the display input unit 220.

The main control unit 200 executes display control on the display panel 221, and operation detection control for detecting a user's operation through the operating unit 240 and the operation panel 222.

With the execution of the display control, the main control unit 200 displays an icon for activating application software or a software key, such as a scroll bar, or displays a window for creating electronic mail. The scroll bar refers to a software key for receiving an instruction to move a display portion of an image which is too large to fit into the display area of the display panel 221.

With the execution of the operation detection control, the main control unit 200 detects a user's operation through the operating unit 240, receives an operation on the icon or an input of a character string in an entry column of the window through the operation panel 222, or receives a scroll request of a display image through the scroll bar.

Furthermore, with the execution of the operation detection control, the main control unit 200 has a touch panel control function of determining whether an operation position on the operation panel 222 is the superimposed portion (display area) overlapping the display panel 221 or the outer edge portion (non-display area) not overlapping the display panel 221, and controlling the sensitive area of the operation panel 222 or the display position of the software key.

The main control unit 200 may detect a gesture operation on the operation panel 222 and may execute a function set in advance according to the detected gesture operation. The gesture operation is not a conventional simple touch operation, but means an operation to render a track with a finger or the like, an operation to simultaneously designate a plurality of positions, or an operation to render a track for at least one of a plurality of positions by combining the operations.

The camera unit 241 is a digital camera which electronically captures an image using an image capture element, such as a complementary metal oxide semiconductor (CMOS) or a charge-coupled device (CCD). The camera unit 241 can convert image data obtained by image capturing to compressed image data, such as joint photographic coding experts group (JPEG), and can record image data in the storage unit 250 under the control of the main control unit 200. Furthermore, the camera unit 241 can output image data through the input/output unit 260 or the wireless communication unit 210. As shown in FIG. 32, in the smartphone 201, the camera unit 241 is mounted on the same surface of the display input unit 220; however, the mounting position of the camera unit 241 is not limited thereto, and the camera unit 241 may be mounted on the rear surface of the display input unit 220, or a plurality of camera units 241 may be mounted. When a plurality of camera units 241 are mounted, the camera unit 241 which is used to capture an image is switched from one to another and captures an image alone, or a plurality of camera units 241 are simultaneously used to capture images.

The camera unit 241 is used for various functions of the smartphone 201. For example, an image acquired by the camera unit 241 can be displayed on the display panel 221, or an image in the camera unit 241 can be used as one operation input on the operation panel 222. When the GPS reception unit 270 detects the position, the position may be detected with reference to an image from the camera unit 241. In addition, the optical axis direction of the camera unit 241 of the smartphone 201 may be determined or the current use environment can be determined with reference to an image from the camera unit 241 without using the three-axis acceleration sensor, or using the three-axis acceleration sensor. Of course, an image from the camera unit 241 may be used in application software.

In addition, image data of a still image or a moving image can be attached with positional information acquired by the GPS reception unit 270, speech information acquired by the microphone 232, speech information to be text information through speech-text conversion in the main control unit or the like, posture information acquired by the motion sensor unit 280, or the like and can be recorded in the storage unit 250, and may be output through the input/output unit 260 or the wireless communication unit 210.

In the smartphone 201 described above, the respective processing units described above in connection with the point image restoration process can be appropriately implemented by, for example, the main control unit 200, the storage unit 250, and the like.

The invention is not limited to the embodiments described above, and various modifications can be made without departing from the spirit of the invention.

EXPLANATION OF REFERENCES

10: digital camera, 12: lens unit, 14: camera body, 16: lens, 17: diaphragm, 18: optical system operating unit, 20: lens unit controller, 22: lens unit input/output unit, 26: image capture element, 28: body controller, 29: user interface, 30: camera body input/output unit, 32: input/output interface, 33: gamma correction processing unit, 34: device control unit, 35: image processing unit, 36: point image restoration control processing unit, 37: luminance distribution acquisition unit, 38: restoration control unit, 39: restoration processing unit, 41: offset correction process, 42: WB correction process, 43: demosaic process, 44: gamma correction process, 45: luminance and color difference conversion process, 46: point image restoration process, 47: color signal conversion process, 51: filter application unit, 52: gain adjustment unit, 53: point image restoration processing unit, 54: blur image correction processing unit, 55: optical system data acquisition unit, 56: filter selection unit, 57: restoration operation processing unit, 58: restoration filter storage unit, 59: filter calculation unit, 60: computer, 62: computer input/output unit, 64: computer controller, 66: display, 70: Internet, 80: server, 82: server input/output unit, 84: server controller, 90: photographing exposure acquisition unit, 91: proper exposure acquisition unit, 101: image capture module, 110: EDoF optical system, 110A: photographing lens, 111: optical filter, 112: image capture element, 114: AD conversion unit, 120: restoration processing block, 122: level adjustment unit, 123: white balance gain unit, 124: gamma processing unit, 125: demosaic processing unit, 126: RGB/YCrCb conversion unit, 127: Y signal restoration processing unit, 200: main control unit, 201: smartphone, 202: housing, 210: wireless communication unit, 220: display input unit, 221: display panel, 222: operation panel, 230: call handling unit, 231: speaker, 232: microphone, 240: operating unit, 241: camera unit, 250: storage unit, 251: internal storage unit, 252: external storage unit, 260: external input/output unit, 270: reception unit, 280: motion sensor unit, 29037: power supply unit

What is claimed is:

1. An image processing device which subjects source image data acquired by photographing an object image using an optical system to a restoration process using a restoration filter based on a point spread function of the optical system to acquire recovered image data, the image processing device comprising:
   a gradation correction circuit which subjects the source image data to gradation correction by a logarithmic process;
   a restoration processing circuit which performs the restoration process by applying the restoration filter having a filter coefficient corresponding to image data before the logarithmic process to the source image data subjected to the gradation correction;
   a luminance distribution acquisition circuit which acquires the luminance distribution of the source image data; and
   a restoration control circuit which controls the restoration process by controlling the restoration processing circuit based on a characteristic of a luminance value equal to or greater than a first threshold value in the luminance distribution.

2. The image processing device according to claim 1, wherein the restoration control circuit
   determines whether or not the source image data satisfies a first luminance state based on the luminance distribution, and
   in case where the source image data satisfies the first luminance state, lowers the restoration intensity of the restoration process compared to in case where the source image data does not satisfy the first luminance state, or does not subject the source image data to the restoration process by controlling the restoration processing circuit.

3. The image processing device according to claim 2, wherein, in case where the source image data satisfies the first luminance state, the restoration control circuit does not subject the source image data to the restoration process and subjects the source image data to a blur image correction process different from the restoration process based on the point spread function of the optical system by controlling the restoration processing circuit.

4. The image processing device according to claim 3, wherein the blur image correction process is a contour enhancement process.

5. The image processing device according to claim 2, wherein the restoration control circuit determines that the source image data satisfies the first luminance state in case where a luminance value indicating the peak of the frequency in the luminance distribution indicating the frequency per luminance of pixels constituting the source image data is equal to or greater than the first threshold value.

6. The image processing device according to claim 2, wherein the restoration control circuit determines that the source image data satisfies the first luminance state in case where a luminance value indicating the peak of the frequency in the luminance distribution indicating the frequency per luminance of pixels constituting the source image data is equal to or greater than the first threshold value.

7. The image processing device according to claim 3, wherein the restoration control circuit determines that the source image data satisfies the first luminance state in case where a luminance value indicating the peak of the frequency in the luminance distribution indicating the frequency per luminance of pixels constituting the source image data is equal to or greater than the first threshold value.

8. The image processing device according to claim 2, wherein the restoration control circuit determines that the source image data satisfies the first luminance state in case where the proportion of pixels having a luminance value equal to or greater than the first threshold value in the luminance distribution indicating the frequency per luminance of pixels constituting the source image data is equal to or greater than a second threshold value.

9. The image processing device according to claim 2, wherein, in case where the source image data satisfies the first luminance state, the restoration control circuit lowers the restoration intensity of the restoration process by controlling the restoration processing circuit and adjusting the filter coefficient of the restoration filter compared to in case where the source image data does not satisfy the first luminance state.

10. The image processing device according to claim 2, wherein the restoration processing circuit applies the restoration filter to the source image data to acquire restored image data, adjusts an amplification factor of the difference between the source image data and the restored image data to determine a difference value after amplification factor adjustment, and acquires the recovered image data from the difference value after amplification factor adjustment and the source image data, and in case where the source image data satisfies the first luminance state, the restoration control circuit lowers the restoration intensity of the restoration process by controlling the restoration processing circuit and adjusting the amplification factor compared to in case where the source image data does not satisfy the first luminance state.

11. An image processing device which subjects source image data acquired by photographing an object image using an optical system to a restoration process using a restoration filter based on a point spread function of the optical system to acquire recovered image data, the image processing device comprising:

a gradation correction circuit which subjects the source image data to gradation correction by a logarithmic process;

a restoration processing circuit which performs the restoration process by applying the restoration filter having a filter coefficient corresponding to image data before a logarithmic process to the source image data subjected to the gradation correction;

an exposure acquisition circuit which acquires a photographing exposure as the exposure of the optical system for acquiring the source image data; and a restoration control circuit which controls the restoration process by controlling the restoration processing circuit based on the photographing exposure.

12. The image processing device according to claim 9, wherein the restoration control circuit controls the restoration process by controlling the restoration processing circuit based on the difference between a proper exposure and the photographing exposure.

13. The image processing device according to claim 1, wherein the optical system has a lens circuit which modulates a phase to extend a depth of field.

14. The image processing device according to claim 1, wherein the restoration processing circuit performs the restoration process by applying the restoration filter to a luminance component of the source image data subjected to the gradation correction.

15. The image processing device according to claim 1, wherein the restoration processing circuit performs the restoration process by applying the restoration filter to a color component of the source image data subjected to the gradation correction.

16. An image capture device comprising:

an image capture element which acquires source image data by photographing using an optical system; and the image processing device according to claim 1.

17. An image processing method which subjects source image data acquired by photographing an object image using an optical system to a restoration process using a restoration filter based on a point spread function of the optical system to acquire recovered image data, the image processing method using the image processing device according to claim 1 comprising:

a gradation correction step of subjecting the source image data to gradation correction by a logarithmic process;

a restoration processing step of performing the restoration process by applying the restoration filter having a filter coefficient corresponding to image data before the logarithmic process to the source image data subjected to the gradation correction; and a luminance distribution acquisition step of acquiring the luminance distribution of the source image data, wherein the restoration process is controlled based on a characteristic of a luminance value equal to or greater than a first threshold value in the luminance distribution.

18. An image processing method which subjects source image data acquired by photographing an object image using an optical system to a restoration process using a restoration filter based on a point spread function of the optical system to acquire recovered image data, the image processing method using the image processing device according to claim 11 comprising:

a gradation correction step of subjecting the source image data to gradation correction by a logarithmic process;

a restoration processing step of performing the restoration process by applying the restoration filter having a filter coefficient corresponding to image data before the logarithmic process to the source image data subjected to the gradation correction; and an exposure acquisition step of acquiring a photographing exposure as the exposure of the optical system for acquiring the source image data, wherein the restoration process is controlled based on the photographing exposure.

19. A non-transitory computer readable medium storing a program which causes the image processing device according to claim 1 as a computer to function as means for subjecting source image data acquired by photographing an object image using an optical system to a restoration process using a restoration filter based on a point spread function of the optical system to acquire recovered image data, the program causing the computer to execute:

a procedure for subjecting the source image data to gradation correction by a logarithmic process;

a procedure for performing the restoration process by applying the restoration filter having a filter coefficient corresponding to image data before the logarithmic process to the source image data subjected to the gradation correction; and a procedure for acquiring the luminance distribution of the source image data, wherein the restoration process is controlled based on a characteristic of a luminance value equal to or greater than a first threshold value in the luminance distribution.

20. A non-transitory computer readable medium storing a program which causes the image processing device according to claim 11 as a computer to function as means for subjecting source image data acquired by photographing an object image using an optical system to a restoration process using a restoration filter based on a point spread function of the optical system to acquire recovered image data, the program causing the computer to execute:

a procedure for subjecting the source image data to gradation correction by a logarithmic process;

a procedure for performing the restoration process by applying the restoration filter having a filter coefficient corresponding to image data before the logarithmic process to the source image data subjected to the gradation correction; and a procedure for acquiring a photographing exposure as the exposure of the optical system for acquiring the source image data, wherein the restoration process is controlled based on the photographing exposure.

* * * * *